(12) United States Patent
Tomita

(10) Patent No.: US 8,305,594 B2
(45) Date of Patent: Nov. 6, 2012

(54) PRINT CONTROL APPARATUS AND METHOD FOR MANAGING PRINT SETTINGS

(75) Inventor: Makoto Tomita, Kawasaki (JP)

(73) Assignee: Canon Kabushiki Kaisha (JP)

( * ) Notice: Subject to any disclaimer, the term of this patent is extended or adjusted under 35 U.S.C. 154(b) by 953 days.

(21) Appl. No.: 12/331,169

(22) Filed: Dec. 9, 2008

(65) Prior Publication Data

US 2009/0147290 A1    Jun. 11, 2009

(30) Foreign Application Priority Data

Dec. 11, 2007    (JP) .................................. 2007-320069

(51) Int. Cl.
  *G06F 3/12*    (2006.01)
(52) U.S. Cl. ...... 358/1.13; 358/1.15; 358/1.1; 358/1.14; 358/1.12; 358/1.2; 358/1.17
(58) Field of Classification Search .................. None
  See application file for complete search history.

(56) References Cited

U.S. PATENT DOCUMENTS

| | | | | |
|---|---|---|---|---|
| 7,057,747 B1 * | 6/2006 | Minagawa | .................. | 358/1.13 |
| 7,251,045 B2 | 7/2007 | Yamamura et al. | | |
| 7,733,507 B2 * | 6/2010 | Toumanova et al. | ......... | 358/1.13 |
| 7,826,073 B2 * | 11/2010 | Park et al. | ....................... | 358/1.1 |
| 7,839,510 B2 * | 11/2010 | Kizaki et al. | .................. | 358/1.13 |
| 2003/0112456 A1 * | 6/2003 | Tomita et al. | ................. | 358/1.13 |
| 2006/0187479 A1 * | 8/2006 | Kikuchi | ........................ | 358/1.13 |
| 2007/0146759 A1 * | 6/2007 | Saito | ............................. | 358/1.13 |

FOREIGN PATENT DOCUMENTS

| | | | |
|---|---|---|---|
| JP | 7223341 | A | 8/1995 |
| JP | 8-185294 | A | 7/1996 |
| JP | 2001-350606 | A | 12/2001 |
| JP | 2002055792 | A | 2/2002 |
| JP | 2003-216362 | A | 7/2003 |
| JP | 2001256007 | * | 11/2003 |
| JP | 2006172094 | A | 6/2006 |
| JP | 2006-252359 | A | 9/2006 |

* cited by examiner

*Primary Examiner* — Benny Q Tieu
*Assistant Examiner* — Paul F Payer
(74) *Attorney, Agent, or Firm* — Rossi, Kimms & McDowell LLP

(57) ABSTRACT

A print control apparatus includes a storage unit configured to store print attributes and print settings corresponding to the print attributes in association with each other, a search unit configured to search the storage unit for a print attribute corresponding to a print attribute of document data in accordance with an instruction to print the document data, and a generation unit configured to, when the corresponding print attribute is detected, set a print setting corresponding to the print attribute as a print setting of the document data and generate print data to be output to the print apparatus, and when no corresponding print attribute can be detected, accept input of a print setting of the document data and generate print data using the accepted print setting.

3 Claims, 28 Drawing Sheets

FIG. 4A

| NO | ATTRIBUTE INFORMATION | | REMARKS |
|---|---|---|---|
| 1 | PRINT METHOD | SINGLE-SIDED, DOUBLE-SIDED, OR BOOKLET PRINTING | |
| 2 | PAPER SIZE | DOCUMENT SIZE OR FIXED SIZE | • Z-FOLD DESIGNATION IN CASE OF DESIGNATION OF "A4 + A3", "B4 + B3", AND "LETTER + LEDGER (11×17)"<br>• AUTOMATICALLY SELECT DOCUMENT SIZE OF FIRST CHAPTER / FIRST PAGE UPON DESIGNATION OF BOOKLET PRINTING OR N-up PRINTING |
| 3 | PAPER ORIENTATION | PORTRAIT OR LANDSCAPE | • SELECTABLE ONLY FOR FIXED SIZE |
| 4 | GUTTER / BINDING LOCATION | | • ALLOW SHIFT AND ENLARGEMENT / REDUCTION DESIGNATION |
| 5 | N-up PRINTING | NUMBER OF PAGES, LAYOUT ORDER, BOUNDARY LINE, LAYOUT POSITION, ETC. | • NINE PATTERNS OF LAYOUT POSITIONS<br>• ALLOW EQUAL-MAGNIFICATION PRINTING DESIGNATION |
| 6 | ENLARGEMENT / REDUCTION | ON / OFF | • AUTOMATIC ON DESIGNATION UPON SELECTION OF PAPER SIZE = FIXED SIZE OR N-up PRINTING; ALLOW OFF DESIGNATION |
| 7 | WATERMARK | | • ALLOW INDEPENDENT DESIGNATION FOR RESPECTIVE LOGICAL PAGES AND RESPECTIVE PHYSICAL PAGES<br>• FOR ALL CHAPTERS / ALL PAGES |

FIG. 4B

| NO | ATTRIBUTE INFORMATION | | REMARKS |
|---|---|---|---|
| 8 | HEADER / FOOTER | | • ALLOW INDEPENDENT DESIGNATION FOR RESPECTIVE LOGICAL PAGES AND RESPECTIVE PHYSICAL PAGES<br>• FOR ALL CHAPTERS / ALL PAGES |
| 9 | DELIVERY METHOD | STAPLING / PUNCH HOLE | • ALLOW STAPLING OR PUNCH HOLE DESIGNATION ONLY FOR SINGLE-SIDED / DOUBLE-SIDED PRINTING<br>• 1 OR 2 STAPLING POSITIONS AVAILABLE |
| 10 | BOOKBINDING DETAILS | OPENING DIRECTION, SADDLE STITCHING, ENLARGEMENT / REDUCTION DESIGNATION, GUTTER, SEPARATE BINDING DESIGNATION, ETC. | • ONLY IN BOOKLET PRINTING |
| 11 | FRONT COVER / BACK COVER | | • PRINTING DESIGNATION FOR FRONT COVER 1 / 2 AND BACK COVER 1 / 2<br>• PAPER FEED PORT (INCLUDING INSERTER) DESIGNATION |
| 12 | INDEX SHEET | | • ALLOW TO SET CHARACTER STRING PRINTING ON INDEX PART AND ANNOTATION ON INDEX SHEET<br>• NOT ALLOW TO DESIGNATE BOOKLET PRINTING |
| 13 | INTERLEAF | | • PAPER FEED PORT (INCLUDING INSERTER) DESIGNATION<br>• ALLOW TO PRINT DOCUMENT DATA ON INSERTED SHEET<br>• NOT ALLOW TO DESIGNATE BOOKLET PRINTING |
| 14 | CHAPTER DIVISION | "NONE", "CHANGE FOR PAGE", OR "CHANGE FOR SHEET" | • FIX "CHANGE FOR SHEET" UPON DESIGNATION OF INDEX SHEET OR INTERLEAF<br>• "CHANGE FOR SHEET" IN SINGLE-SIDED PRINTING |

FIG. 5

| NO | ATTRIBUTE INFORMATION | | REMARKS |
|---|---|---|---|
| 1 | PAPER SIZE | DOCUMENT SIZE OR FIXED SIZE | · AUTOMATICALLY DESIGNATE "CHANGE FOR SHEET" UPON SELECTION OF FIXED SIZE<br>· ALLOW TO CHANGE ONLY DESIGNATED SHEET UPON SELECTION OF PLURAL SHEETS IN BOOK; ALLOW TO CHANGE PAPER SIZE IN DESIGNATION TO FIT TO BOOK |
| 2 | PAPER ORIENTATION | PORTRAIT OR LANDSCAPE | · ALLOW TO DESIGNATE ONLY FOR FIXED SIZE |
| 3 | N-up PRINTING DESIGNATION | NUMBER OF PAGES, LAYOUT ORDER, BOUNDARY LINE, LAYOUT POSITION, ETC. | · NINE PATTERNS OF LAYOUT POSITIONS<br>· ALLOW EQUAL-MAGNIFICATION PRINTING DESIGNATION |
| 4 | ENLARGEMENT / REDUCTION | ON / OFF | · AUTOMATIC ON DESIGNATION UPON SELECTION OF PAPER SIZE = FIXED SIZE OR N-up PRINTING; ALLOW OFF DESIGNATION |
| 5 | WATERMARK | DISPLAY / NON-DISPLAY | · DESIGNATE WHETHER OR NOT TO DISPLAY ALL WATERMARKS DESIGNATED IN BOOK |
| 6 | HEADER / FOOTER | DISPLAY / NON-DISPLAY | · DESIGNATE WHETHER OR NOT TO DISPLAY ALL HEADERS / FOOTERS DESIGNATED IN BOOK |
| 7 | DELIVERY METHOD | STAPLING | · ALLOW TO DESIGNATE OFF IN CASE OF STAPLING DESIGNATION IN BOOK; DEFAULT = ON |

FIG. 6

| NO | ATTRIBUTE INFORMATION | | REMARKS |
|---|---|---|---|
| 1 | PAGE ROTATION DESIGNATION | | • ALLOW TO DESIGNATE 0, 90, 180, OR 270° |
| 2 | WATERMARK | DISPLAY / NON-DISPLAY | • DESIGNATE WHETHER OR NOT TO DISPLAY ALL WATERMARKS DESIGNATED IN BOOK |
| 3 | HEADER / FOOTER | DISPLAY / NON-DISPLAY | • DESIGNATE WHETHER OR NOT TO DISPLAY ALL HEADERS/FOOTERS DESIGNATED IN BOOK |
| 4 | ZOOM | 50%–200% | • DESIGNATE RELATIVE COPY RATIO TO HAVE SIZE THAT FITS VIRTUAL LOGICAL PAGE AREA AS 100% |
| 5 | LAYOUT POSITION | | • DESIGNATE FIXED NINE PATTERNS AND ARBITRARY POSITION |
| 6 | ANNOTATION | | |
| 7 | VARIABLE ITEM | | |
| 8 | PAGE DIVISION | | |

FIG. 8

PRINT

PRINTER NAME (N): [My Printer] ▶    PROPERTIES (P)...
☐ MATCH PRINT STYLE WITH PRINTER FUNCTIONS (E)

LIST OF FUNCTIONS UNAVAILABLE:
    DESIGNATED PAPER SOURCE (AUTO)
    COLOR PRINTING
    INSERTION OF INDEX SHEET (UNDEFINED)

SELECTED DRIVER CANNOT ACQUIRE PRINTER INFORMATION. CHECK "UNDEFINED" FUNCTION ON PRINTER DRIVER, AND SET IT IF NECESSARY.

NUMBER OF COPIES (C): [1] [2 2] [3 3 3]    1    PRINT COPIES (M)...
    ☐ COLLATE (O)
    ☐ SHIFT (F)    UNIT (U): 1 COPIES

SET DELIVERY: AUTO PANEL PRIORITY    SET DELIVERY (I)...

☐ VARIABLE PRINTING (V)
   ⊙ PRINT ALL RECORDS (R)
   ○ PRINT ONLY DESIGNATED RECORDS (B) [    ] RECORDS

PRINT WHAT (T): DOCUMENT (ALL) ▶

[        ]

OK    CANCEL    HELP (H)

FIG. 14

| | | |
|---|---|---|
| PAGE LAYOUT | TWO PAGES / SHEET | 1401 |
| LAYOUT ORDER | LEFT TO RIGHT | 1402 |
| STAMP | CONFIDENTIAL | 1403 |
| NUMBER OF COPIES | 1 | 1404 |
| BINDING LOCATION | LEFT | 1405 |
| GUTTER | 5mm | 1406 |
| MARGIN | 6mm | 1407 |
| IMPOSITION | SADDLE STITCHING | 1408 |
| OPENING DIRECTION | LEFT OPENING | 1409 |
| SEPARATE BINDING | EVERY 15 SHEETS | 1410 |

FIG. 15

| | | |
|---|---|---|
| DELIVERY METHOD | STAPLING | 1501 |
| PRINT METHOD | DOUBLE-SIDED PRINTING | 1502 |
| PAPER SOURCE | CASSETTE 1 | 1503 |
| RESOLUTION | FINE | 1504 |

FIG. 16

| | | |
|---|---|---|
| PRINTER NAME | Color MFP | ~1601 |
| DEVMODE VERSION | V1.0 | ~1602 |
| DEVMODE SIZE | 200Byte | ~1603 |
| SHEET | A4 | ~1604 |
| PAPER ORIENTATION | PORTRAIT | ~1605 |
| COLOR MODE | COLOR | ~1606 |
| PAGE LAYOUT | TWO PAGES / SHEET | ~1607 |
| BINDING LOCATION | LEFT | ~1608 |
| GUTTER | 5mm | ~1609 |
| PRINT METHOD | DOUBLE-SIDED PRINTING | ~1610 |
| DELIVERY METHOD | STAPLING | ~1611 |
| NUMBER OF COPIES | 1 | ~1612 |

FIG. 26

SETTINGS OF ENTIRE DOCUMENT

| PAPER SETUP | PAGE SETUP | FINISHING | EDIT | PAPER SOURCE | QUALITY |

OUTPUT PAPER SIZE (S): [A3]

OUTPUT PAPER ORIENTATION (T): [A] ○ PORTRAIT [A] ● LANDSCAPE ~ 2601

FINISHING SIZE (F): [ENLARGE / REDUCE IN ACCORDANCE WITH [IMPOSITION TYPE] ▼] ~ 2602

FINISHING ORIENTATION (O): [A] ○ PORTRAIT [A] ● LANDSCAPE

☐ ENLARGE / REDUCE DOCUMENT IN ACCORDANCE WITH FINISHING SIZE (Z)

IMPOSITION MODE (I): ● STANDARD ○ SIMPLE

IMPOSITION TYPE (L): [SADDLE STITCHING ▼]   NUMBER OF IMPOSITION (U)...
                                              ~ 2603

HOW TO IMPOSE (D): [PAGE ORDER ▷]

☐ PRINTER'S MARK (R)   [PRINTER'S MARK SETTINGS (N)...]

[USER DEFINITION (M)...]

[VARIABLE PRINTING (P)...]

☐ ENLARGE / REDUCE DOCUMENT IN ACCORDANCE WITH FINISHING PAGE MARGIN (N)

[FINISHING PAGE MARGIN (G)...]

[RESTORE LATEST SAVED SETTINGS] [SETTINGS (V)]

[OK] [CANCEL] [APPLY(A)] [HELP (H)]

| | | |
|---|---|---|
| PAGE LAYOUT | ONE PAGE / SHEET | ~1401 |
| LAYOUT ORDER | LEFT TO RIGHT | ~1402 |
| STAMP | CONFIDENTIAL | ~1403 |
| NUMBER OF COPIES | 1 | ~1404 |
| BINDING LOCATION | LEFT * | ~1405 |
| GUTTER | 5mm | ~1406 |
| MARGIN | 6mm | ~1407 |
| IMPOSITION | SADDLE STITCHING * | ~1408 |
| OPENING DIRECTION | LEFT OPENING * | ~1409 |
| SEPARATE BINDING | EVERY 15 SHEETS * | ~1410 |

FIG. 29

| | | |
|---|---|---|
| DELIVERY METHOD | SADDLE STITCH & STAPLE * | ~1501 |
| PRINT METHOD | DOUBLE-SIDED PRINTING | ~1502 |
| PAPER SOURCE | CASSETTE 1 | ~1503 |
| RESOLUTION | FINE | ~1504 |

FIG. 30

| PAGE LAYOUT | ONE PAGE / SHEET | ~1401 |
|---|---|---|
| LAYOUT ORDER | LEFT TO RIGHT | ~1402 |
| STAMP | CONFIDENTIAL | ~1403 |
| NUMBER OF COPIES | 1 | ~1404 |
| BINDING LOCATION | OFF * | ~1405 |
| GUTTER | 5mm | ~1406 |
| MARGIN | 6mm | ~1407 |
| IMPOSITION | 1×1 * | ~1408 |
| OPENING DIRECTION | OFF * | ~1409 |
| SEPARATE BINDING | OFF * | ~1410 |

FIG. 31

| DELIVERY METHOD | OFF * | ~1501 |
|---|---|---|
| PRINT METHOD | DOUBLE-SIDED PRINTING | ~1502 |
| PAPER SOURCE | CASSETTE 1 | ~1503 |
| RESOLUTION | FINE | ~1504 |

FIG. 32

| | | |
|---|---|---|
| PRINTER NAME | Color MFP | ~1601 |
| DEVMODE VERSION | V1.0 | ~1602 |
| DEVMODE SIZE | 200Byte | ~1603 |
| SHEET | A3 | ~1604 |
| PAPER ORIENTATION | LANDSCAPE | ~1605 |
| COLOR MODE | COLOR | ~1606 |
| PAGE LAYOUT | ONE PAGE / SHEET | ~1607 |
| BINDING LOCATION | LEFT | ~1608 |
| GUTTER | 5mm | ~1609 |
| PRINT METHOD | DOUBLE-SIDED PRINTING | ~1610 |
| DELIVERY METHOD | OFF * | ~1611 |
| NUMBER OF COPIES | 1 | ~1612 |

FIG. 33

| | | |
|---|---|---|
| PRINTER NAME | Color MFP | ~1601 |
| DEVMODE VERSION | V1.0 | ~1602 |
| DEVMODE SIZE | 200Byte | ~1603 |
| SHEET | A3 | ~1604 |
| PAPER ORIENTATION | LANDSCAPE | ~1605 |
| COLOR MODE | COLOR | ~1606 |
| PAGE LAYOUT | ONE PAGE / SHEET | ~1607 |
| BINDING LOCATION | LEFT | ~1608 |
| GUTTER | 5mm | ~1609 |
| PRINT METHOD | DOUBLE-SIDED PRINTING | ~1610 |
| DELIVERY METHOD | SADDLE STITCH & STAPLE * | ~1611 |
| NUMBER OF COPIES | 1 | ~1612 |

PRINT CONTROL APPARATUS AND METHOD FOR MANAGING PRINT SETTINGS

BACKGROUND OF THE INVENTION

1. Field of the Invention

The present invention relates to a print control apparatus which controls print processing.

2. Description of the Related Art

A conventional document processing system allows the user to edit or arrange data while checking an output result from a preview or the like. A specific controllable output device allows the user to designate finishing (e.g., stapling or punching) and printing by a printer.

When executing finishing control for the printer, the document processing system needs to grasp a printer control method in advance. Finishing control can be done for the printer as long as information on the control method can be obtained from a printer manufacturer. Finishing control can also be performed for the printer as long as the control method is laid open to the public or only for some standardized control items. To output data to a printer whose control method is unknown, the user himself must make necessary cumbersome settings before printing via a printer driver provided by the printer manufacturer.

To reduce setting cumbersomeness, a method of saving a combination of frequently used settings with a name, and selecting desired settings by the user to simplify setting procedures is widely known as a function "My Favorites".

Japanese Patent Laid-Open No. 2006-252359 discloses a printer driver capable of measuring the frequency of use, reflecting settings in a printer driver, and setting not to display hardly used setting items or/and setting values. This printer driver can further facilitate settings by the user on a print window by disabling display of setting items and setting values not used by him. Japanese Patent Laid-Open No. 2003-216362 discloses a printer driver capable of displaying printer print difference settings as differences between initial printer print settings and current printer print settings. This printer driver allows the user to efficiently check the contents of printer print settings. Japanese Patent Laid-Open No. 2001-350606 discloses a method of simplifying setting procedures for a previously printed document by reflecting previous print conditions saved in association with the document name when invoking print settings. Japanese Patent Laid-Open No. 8-185294 discloses a method of simplifying setting procedures for a user who has previously printed, by reflecting previous print conditions saved in association with the user name when invoking print settings.

Functions such as "My Favorites" can simplify setting procedures because a plurality of settings can be made at once. However, the user himself needs to make settings every printing while grasping the setting contents. In many cases, the user sets a plurality of setting items, complicating the operation. When executing printing with a variety of settings, the user needs to register in advance a combination of settings as "My Favorites". The user needs to select proper settings from many registered "My Favorites". Hence, it becomes difficult to select proper settings from many settings. The method of controlling the display of setting values and checking setting values is premised on that the user understands the meaning of each setting value. However, when outputting data a print application in the document processing system to a printer available from a manufacturer different from the manufacturer of the print application, it is difficult to recognize detailed setting contents. According to the method of saving print settings in association with the document name, the user needs to make settings at least once for each document. The user needs to make settings every time he creates a new document. Even when the output destination changes, the user needs to newly make settings. According to the method of saving print settings in association with the user name, only print settings in immediately preceding printing are saved. In practice, the user often makes settings in accordance with print contents every printing. When the output destination changes, the user needs to newly make settings.

SUMMARY OF THE INVENTION

The present invention provides a print control apparatus capable of improving user friendliness when outputting data from an application to a printer.

The present invention in its first aspect provides a print control apparatus which controls a print apparatus to print document data having print attributes including a print attribute incompatible with print settings transferred to the print apparatus, the print control apparatus comprising: a storage unit configured to store print attributes and print settings corresponding to the print attributes in association with each other; a search unit configured to search the storage unit for a print attribute corresponding to a print attribute of document data in accordance with an instruction to print the document data; and a generation unit configured to, when the search unit detects the corresponding print attribute, set a print setting corresponding to the print attribute as a print setting of the document data and generate print data to be output to the print apparatus, and when the search unit cannot detect the corresponding print attribute, accept input of a print setting of the document data and generate print data using the accepted print setting.

The present invention in its second aspect provides a print control method of controlling a print apparatus to print document data having print attributes including a print attribute incompatible with print settings transferred to the print apparatus, the method comprising: a storage step of storing print attributes and print settings corresponding to the print attributes in association with each other; a search step of searching for a print attribute in the storage step that corresponds to a print attribute of document data in accordance with an instruction to print the document data; and a generation step of, when the corresponding print attribute is detected in the search step, setting a print setting corresponding to the print attribute as a print setting of the document data and generating print data to be output to the print apparatus, and when no corresponding print attribute can be detected, accepting input of a print setting of the document data and generating print data using the accepted print setting.

The present invention in its third aspect provides a computer-readable medium which stores a print control program for controlling a print apparatus to print document data having print attributes including a print attribute incompatible with print settings transferred to the print apparatus, the program causing a computer to store print attributes and print settings corresponding to the print attributes in association with each other, search for a print attribute corresponding to a print attribute of document data in accordance with an instruction to print the document data, and when the corresponding print attribute is detected, set a print setting corresponding to the print attribute as a print setting of the document data and generate print data to be output to the print apparatus, and when no corresponding print attribute can be detected, accept input of a print setting of the document data and generate print data using the accepted print setting.

The present invention can improve user friendliness when outputting data from an application to a printer.

Further features of the present invention will become apparent from the following description of exemplary embodiments with reference to the attached drawings.

BRIEF DESCRIPTION OF THE DRAWINGS

FIGS. 4A and 4B are tables for explaining book attributes shown in FIG. 3A;

FIG. 5 is a table for explaining chapter attributes shown in FIG. 3A;

FIG. 6 is a table for explaining page attributes shown in FIG. 3A;

FIG. 8 is a view showing an example of a print window in a bookbinding application;

FIG. 14 is a view showing an example of detailed settings in page layout information shown in FIG. 12;

FIG. 15 is a view showing an example of detailed settings of printer instruction information shown in FIG. 12;

FIG. 16 is a view showing an example of the structure of instruction information;

FIG. 22 is a view showing an example of a warning dialog displayed when a setting file, all the print items of which match current guidance items, is referred to;

FIG. 23 is a view showing an example of a warning dialog displayed when a setting file, all the print items of which match current guidance items, is not referred to;

FIG. 26 is a view showing an example of a bookbinding application setup window;

FIG. 27 is a view showing another example of the bookbinding application setup window;

FIG. 28 is a view showing page layout information in a print instruction document before change;

FIG. 29 is a view showing printer instruction information in the print instruction document before change;

FIG. 30 is a view showing changed page layout information;

FIG. 31 is a view showing changed printer instruction information;

FIG. 32 is a view showing an example of a DEVMODE generated in accordance with a changed print instruction; and FIG. 33 is a view showing an example of a DEVMODE generated in general print processing.

DESCRIPTION OF THE EMBODIMENT

Figure 1:
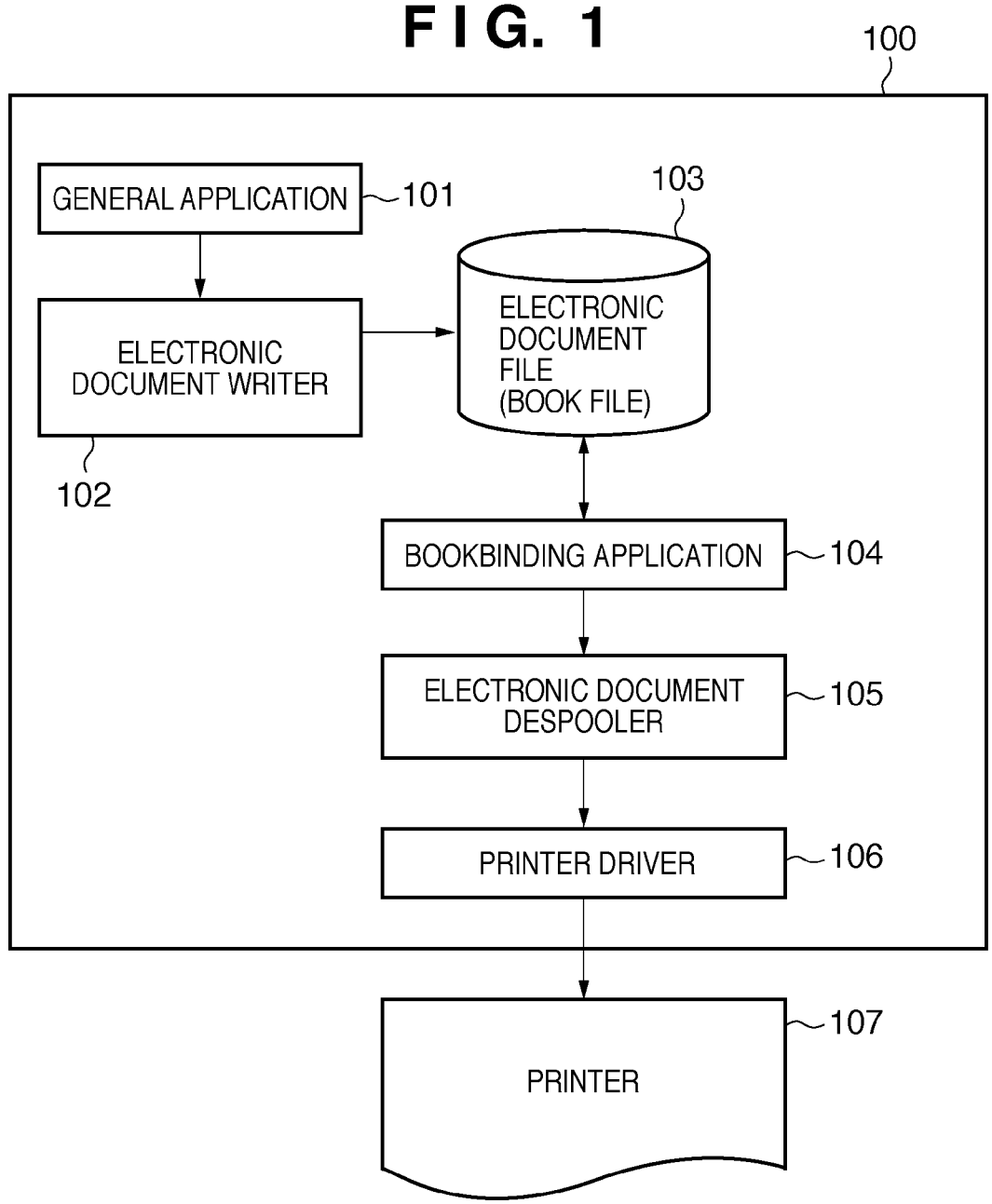
FIG. 1 is a block diagram showing the software configuration of a document processing system according to an embodiment of the present invention.

A preferred embodiment of the present invention will be described in detail with reference to the drawings. The same reference numerals denote the same parts, and a description thereof will not be repeated.

FIG. 1 is a block diagram showing the software configuration of a document processing system according to the embodiment of the present invention. The document processing system is implemented by a print control apparatus 100. An outline of the document processing system according to the embodiment of the present invention will be explained with reference to FIGS. 1 to 12. In the document processing system, an electronic document writer converts a data file created by a general application into an electronic document file. In the embodiment, a bookbinding application provides a function of editing a converted electronic document file.

A general application 101 is a general application program which provides functions such as wordprocessing, spreadsheet, photo retouch, draw or paint, presentation, and text editing. The general application 101 has a print function. The general application 101 uses a predetermined interface provided by an OS (Operating System) when printing application data such as created document data and image data. When printing created data, the general application 101 transmits a predetermined output command (GDI function) of an OS-dependent format to the output module of the OS which provides the interface. Upon receiving the output command, the output module converts the command into a format processable by an output device such as a printer, and outputs the converted command (DDI function). The format processable by an output device changes depending on the type, manufacturer, model, and the like of the device, and a device driver is provided for each device. By using the device driver, the OS converts a command to generate print data. The OS bundles print data in a JL (Job Language), generating a print job. For example, when the OS is Microsoft Windows®, the output module is a GDI (Graphical Device Interface).

An electronic document writer 102 is a software module which is an improvement of the above-described device driver and is provided to implement the document processing system in the embodiment. However, the electronic document writer 102 does not intend any specific output device. The electronic document writer 102 generates an electronic document file 103 by converting an output command into a format processable by a bookbinding application 104 or printer driver 106 (to be described later). The format (to be also referred to as an "electronic document format" hereinafter) after conversion by the electronic document writer 102 suffices to express the document of each page in a detailed form. Of practical standard formats, for example, the PDF format of Adobe Systems, the SGML format, and the like are also available as the electronic document format. When the general application 101 uses the electronic document writer 102, it designates the electronic document writer 102 as a device driver used in output, and then executes printing.

The bookbinding application 104 designates a new electronic document file generated by the electronic document writer 102 as one with the designation of the output form (to be described later). When these two electronic document files need to be discriminated, a file created by the electronic document writer 102 will be called an "electronic document file", and an electronic document file given a structure by the bookbinding application 104 will be called a "book file". When these two files need not be especially distinguished, all of a document file, electronic document file, and book file generated by the general application will be called a document file (or document data).

When the electronic document writer 102 is designated as a device driver and the general application 101 prints data, the application data is converted into the electronic document format of each page defined by the general application 101. The converted application data is stored as the electronic document file 103 in a storage medium such as a hard disk. A page defined by the general application 101 will also be called a "logical page" or "document page". The hard disk may also be the local drive of the print control apparatus 100 which implements the document processing system according to the embodiment, or may also be a drive provided on a network when the system is connected to the network.

The bookbinding application 104 provides the user with a function of reading the "electronic document file" or "book file" 103 and allowing him to edit the read file. The bookbinding application 104 also provides a function of editing an output form such as the structures of a chapter and book (to be described later) which are formed from pages as minimum units. When printing the electronic document file 103 edited by the bookbinding application 104, the bookbinding application 104 activates an electronic document despooler 105.

The electronic document despooler 105 reads out a designated book file from the hard disk. To print each page in a format described in the readout book file, the electronic document despooler 105 generates an output command suited to the output module (not shown) of the OS, and outputs it to the output module. At this time, the electronic document despooler 105 designates, as a device driver, the printer driver 106 for a printer 107 used as the output device. By using the designated printer driver 106 of the printer 107, the output module converts the received output command into a device command interpretable and executable by the printer 107. The device command is transmitted to the printer 107, and the printer 107 prints an image corresponding to the command.

Figure 2:
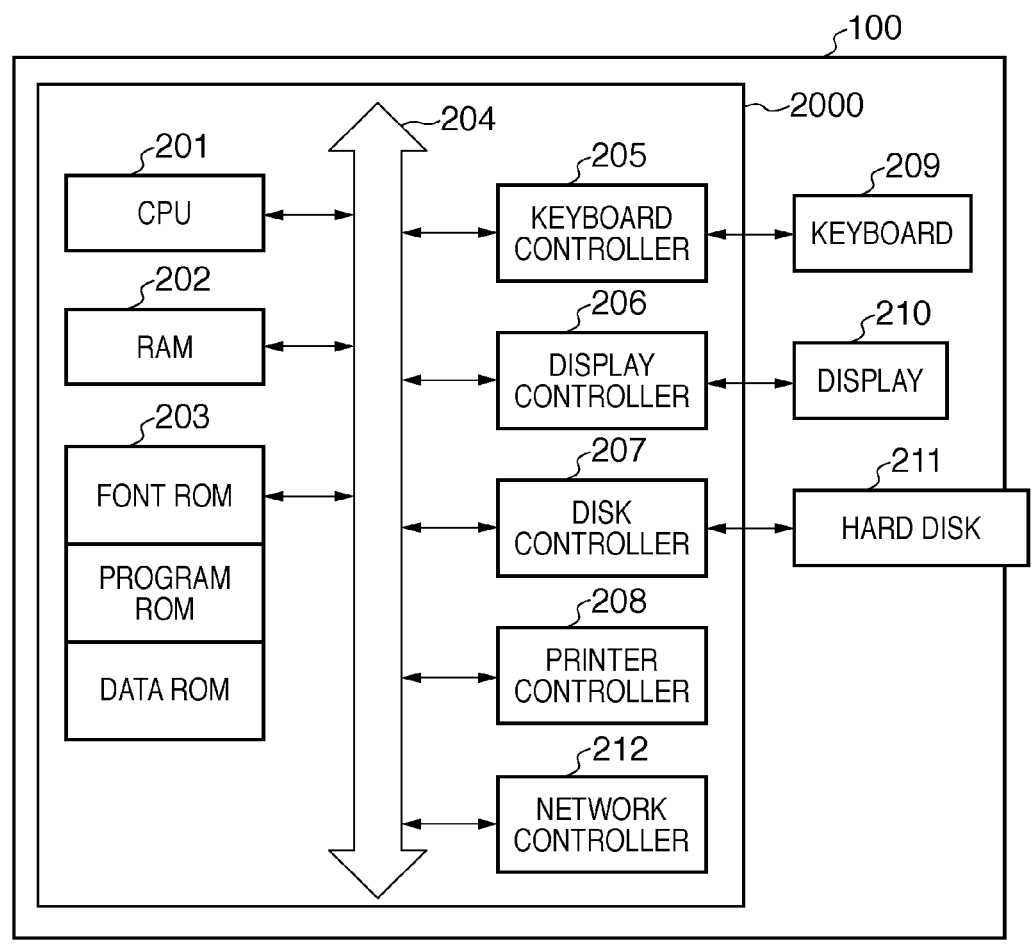
FIG. 2 is a block diagram showing the hardware configuration of a print control apparatus shown in FIG. 1.

FIG. 2 is a block diagram showing the hardware configuration of the print control apparatus 100 shown in FIG. 1. In FIG. 2, a CPU 201 executes a program such as an OS, the general application 101, or the bookbinding application 104 which is stored in the program ROM of a ROM 203 or loaded from a hard disk 211 to a RAM 202. The CPU 201 also implements the software configuration shown in FIG. 1, and the sequence of a flowchart (to be described later). The RAM 202 functions as, for example, the main memory and work area of the CPU 201. A keyboard controller 205 controls key inputs from a keyboard 209 and a pointing device (not shown). A CRT controller 206 controls display on a display 210. The display 210 is, for example, a CRT, liquid crystal display, or plasma display. A disk controller 207 controls access to a Floppy® disk (not shown) or a hard disk 211 which stores a boot program, various applications, font data, user files, edit files (to be described later), and the like. A printer controller 208 controls exchange of signals with the connected printer 107. A network controller 212 executes communication control processing with another device connected to a network. As shown in FIG. 2, the CPU 201 to network controller 212 are connected by a bus 204.

Prior to a detailed description of the bookbinding application 104, the data format of the "book file" will be explained. In the embodiment, the book file has a three-layered structure which simulates a book of paper media. An upper layer among the three layers is called a "book", simulates one book, and defines attributes associated with the entire book. An intermediate layer below the upper layer corresponds to a chapter in a book, and is also called a "chapter". As for each "chapter", attributes for the chapter can be defined. A lower layer below the intermediate layer is a "page", and corresponds to each page defined by the application program. As for each page, attributes for the page can also be defined. One "book" can include a plurality of "chapters", and each "chapter" can include a plurality of "pages".

Figure 3A:
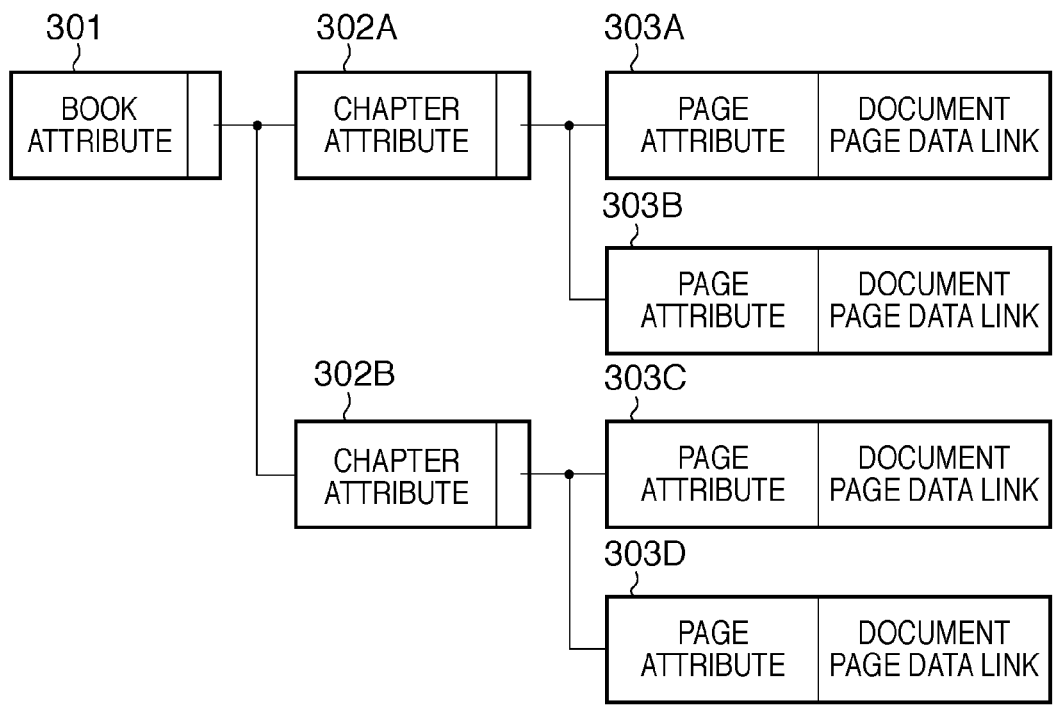
FIGS. 3A and 3B are views schematically showing an example of the format of a book file.
Figure 3B:
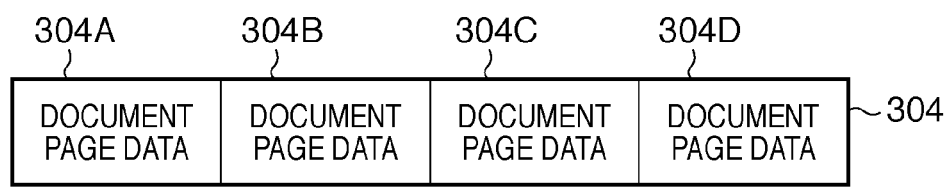

FIGS. 3A and 3B are views schematically showing an example of the format of the book file. A "book", "chapter", and "page" in the book file shown in FIG. 3A are respectively indicated by corresponding nodes. One book file includes one "book". The "book" and "chapter" are concepts for defining a "book" structure, and include defined attribute values and links to lower layers as their entities. A "page" has, as entities, data of each "page" output from an application program. In addition to an attribute value, the "page" includes the entities of a document page (document page data) and a link to each document page data. When outputting a print page onto a paper medium or the like, the print page sometimes includes a plurality of document pages. This structure is indicated not by links but by attributes in the layers "book", "chapter", and "page".

As shown in FIG. 3A, a book attribute 301 is linked to two chapters 302A and 302B. These links represent that the book attribute 301 contains the chapter attributes 302A and 302B. The chapter attribute 302A is linked to page attributes 303A and 303B, and these links represent that the chapter attribute 302A contains these pages. The page attributes 303A and 303B have defined attribute values, and contain links to document page data 304A and 304B serving as the entities of the page attributes 303A and 303B. These links designate the document page data 304A and 304B shown in FIG. 3B, and represent that the entities of the page attributes 303A and 303B are the document page data 304A and 304B. Similarly, the chapter 302B contains page attributes 303C and 303D. The page attributes 303C and 303D contain links to document page data 304C and 304D serving as the entities of the page attributes 303C and 303D. These links designate the document page data 304C and 304D shown in FIG. 3B, and represent that the entities of the page attributes 303C and 303D are the document page data 304C and 304D.

FIGS. 4A and 4B are tables for explaining book attributes shown in FIG. 3A. The book attribute 301 includes a plurality of items, such as PRINT METHOD, PAPER SIZE, PAPER ORIENTATION, GUTTER/BINDING LOVATION, N-up PRINTING, ENLARGEMENT/REDUCTION, WATER MARK, HEADER/FOOTER, DELIVERY METHOD, BOOKBINDING DETAILS, FRONT COVER/BACK COVER, INDEX SHEET, INTERLEAF, CHAPTER DIVISION. In the embodiment, as for an item which can also be repetitively defined in a lower layer, an attribute value in the lower layer is preferentially adopted. As for an item included in only the book attribute 301, a value defined in the book attribute 301 is valid throughout the entire book. However, as for an item which overlaps one in a lower layer, a value defined in the book attribute 301 is used as a specific value when it is not defined in a lower layer. Note that each item shown in FIGS. 4A and 4B does not always correspond to one item, but may also include a plurality of related items.

FIG. 5 is a table for explaining chapter attributes shown in FIG. 3A. The chapter attribute includes a plurality of items, such as PAPER SIZE, PAPER ORIENTATION, N-up PRINTING DESIGNATION, ENLARGEMENT/REDUCTION, WATERMARK, HEADER/FOOTER, DELIVERY METHOD. FIG. 6 is a table for explaining page attributes shown in FIG. 3A. The page attribute includes a plurality of items, such as PAGE ROTATION DESIGNATION, WATERMARK, HEADER/FOOTER, ZOOM, LAYOUT POSITION, ANNOTATION, VARIABLE ITEM, PAGE DIVISION. The relationship between chapter attributes and page attributes is the same as the above-described relationship between the book attributes and the attributes of lower layers. Items unique to the book attributes 301 in FIGS. 4A and 4B are six items "print method", "bookbinding details", "front cover/back cover", "index sheet", "interleaf", and "chapter division". These items are defined throughout the book. As attributes of the "print method", three values "single-sided printing", "double-sided printing", and "booklet printing" can be designated. "Booklet printing" is to print in a format capable of bundling a designated number of sheets, folding the bundle into two, and stitching the bundle to bind it. The "bookbinding details" attribute allows designating "opening direction", "the number of sheets to be bound", and the like when the "print method" designates "booklet printing". The "front cover/back cover" attribute includes designation of adding sheets as front and back covers, and designation of print contents on the added sheets when printing an electronic document file bound as a book. The "index sheet" attribute includes designation of inserting an index sheet with an index part (tab) prepared separately in a print apparatus in order to divide a book into chapters, and designation of print contents on the index part. This attribute becomes valid when the print apparatus for use includes an inserter having an insert function of inserting a sheet prepared separately from print sheets to a desired position, or when a plurality of paper cassettes are available. This also applies to an "interleaf" attribute. The "interleaf" attribute includes designation of inserting a sheet supplied from an inserter or paper cassette in order to divide a book into chapters, and designation of a paper source when inserting an interleave. The "chapter division" attribute includes designation of, for example, whether to use a new sheet, use a new print page, or do nothing at the break between chapters. In "single-sided printing", the use of a new sheet means the use of a new print page. In "double-sided printing", if "to use a new sheet" is designated, successive chapters are not printed on one sheet. However, if "to use a new print page" is designated, successive chapters may also be printed on the obverse and reverse sides of one sheet.

As for chapter attributes shown in FIG. 5, there are no items unique to chapters, and all items overlap those of the book attributes. If a definition in the chapter attribute is different from that in the book attribute, a value defined in the chapter attribute is used preferentially. Items common to only the book attributes and chapter attributes are five items "paper size", "paper orientation", "N-UP printing designation", "enlargement/reduction", and "delivery method". Of these items, the "N-UP printing designation" attribute is an item for designating the number of document pages included in one print page. As layouts that can be designated, "1×1", "1×2", "2×2", "3×3", "4×4", and the like are available. The "delivery method" attribute is an item for designating whether or not to staple discharged sheets. The validity of this attribute depends on whether or not the print apparatus used has the stapling function.

Figure 7:
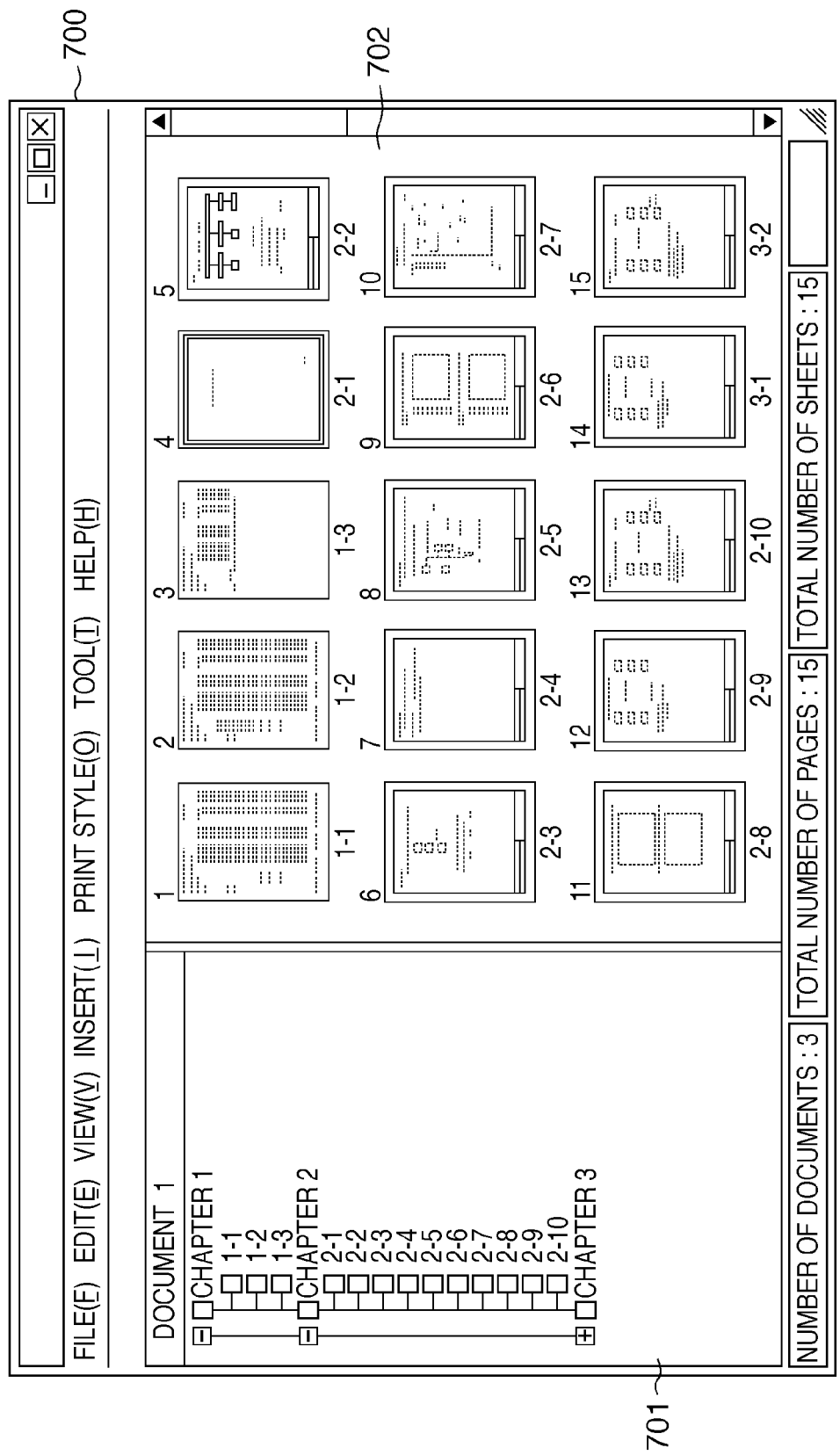
FIG. 7 is a view showing an example of a user interface window.

The bookbinding application 104 displays a user interface (UI) window in accordance with the structure, attributes, and contents of a book file serving as an electronic document file. FIG. 7 is a view showing an example of a displayed user interface window. A window 700 includes a tree area 701 which represents the structure of a book, and a preview area 702 which displays a printed state. The tree area 701 displays chapters included in the book, and pages included in the chapters in a tree structure as shown in FIG. 3A. The tree area 701 shows page numbers, and the page numbers are document page numbers. The preview area 702 shows the contents of reduced print pages. The display order reflects the book structure. The user can execute the following edit operations for the chapters and pages of a book file via the user interface:

(1) New addition
(2) Delete
(3) Copy
(4) Cut
(5) Paste
(6) Move
(7) Change chapter name
(8) Page renumbering
(9) Insert cover
(10) Insert Interleaf
(11) Insert index sheet
(12) Page layout on each document page In addition, an operation to cancel the edit operation executed once, and an operation to redo the canceled operation can also be performed. These edit functions enable edit operations such as integration of a plurality of book files, rearrangement of chapters and pages in a book file, deletion of chapters and pages in a book file, layout change of document pages, and insertion of interleaves and index sheets. After these operations are executed, the operation results are reflected in the attributes shown in FIGS. 4 to 6, or in the structure of the book file. For example, if an operation to newly add a blank page is done, a blank page is inserted at a designated position. The blank page is processed as a document page. If the layout of document pages is changed, the change contents are reflected in the attributes of the print method, N-UP print, front cover/back cover, index sheet, interleaf, chapter division, and the like.

A book file is created and edited in the above-described manner in order to print it out. When the user selects a file menu from the bookbinding application window 700 shown in FIG. 7, and then selects "print", a book file can be printed out from a designated output device. In this case, the electronic document despooler 105 generates an OS output command, which is a Windows® GDI command, from a book file generated by the bookbinding application 104, and transmits the output command to, for example, a GDI output module. The output module causes a designated printer driver 106 to generate a command suited to the device, and transmits the command to the device.

FIG. 8 is a view showing an example of a print window in the bookbinding application 104. In an area 801 in FIG. 8, the user designates a printer (printer driver) used in printing, and can select one of printer drivers registered and set in a client PC. In an area 803, the user designates the number of copies to be printed. When a printer selected in the area 801 does not have functions (incompatible functions) among function settings made for the printer in the window of FIG. 27 (to be described later) or these functions cannot be designated, an area 802 notifies the user of these function items. As for functions notified in the area 802, when the user presses an OK button and executes printing, the bookbinding application 104 temporarily cancels the settings of the functions and generates a book file to be transferred to the electronic document despooler 105. In the embodiment, a book file can be printed by changing a print instruction to one processable by the performance of a selected printer. Details of these processes will be described later.

Figure 9:
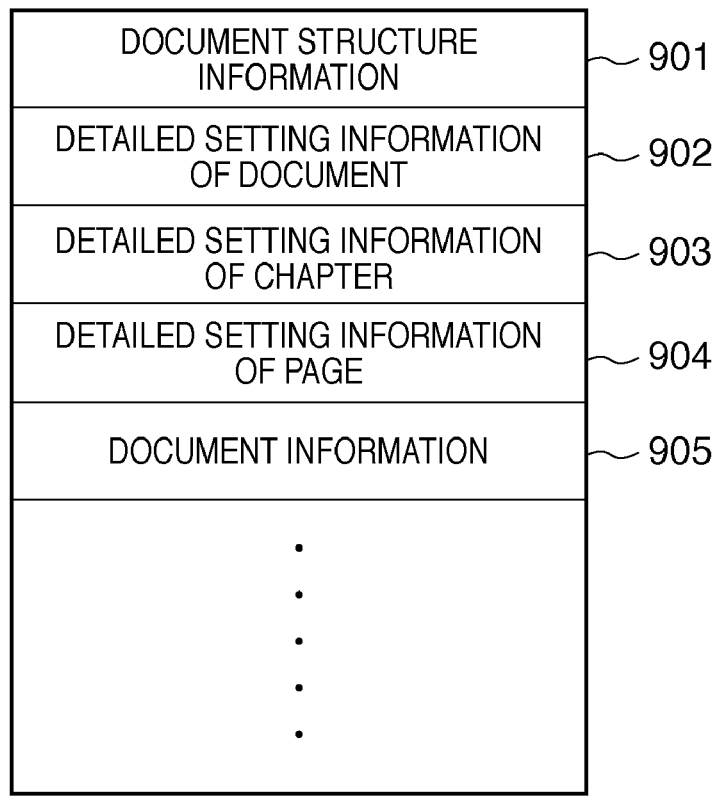
FIG. 9 is a view for explaining the data structure of a document file processed by an application.

FIG. 9 is a view for explaining the data structure of a document file processed by the general application 101. The document file corresponds to the electronic document file 103 shown in FIG. 1, and is stored in, for example, the external memory of the print control apparatus 100. In FIG. 9, a field 901 represents structure information of a document, and stores information on a document structure displayed in the tree area 701 of the user interface window shown in FIG. 7. A field 902 represents detailed setting information of the document, and stores information settable in the entire document. A field 903 represents detailed setting information of a chapter, and stores information settable in each chapter. A field 904 represents detailed setting information of a page, and stores information settable in each page. A field 905 represents document information, and stores rendering information of each document page. The field 905 also stores, for each page, information displayed in the preview area 702 shown in FIG. 7. The document file contains other kinds of information necessary for each document, but a description thereof will be omitted.

Figure 10:
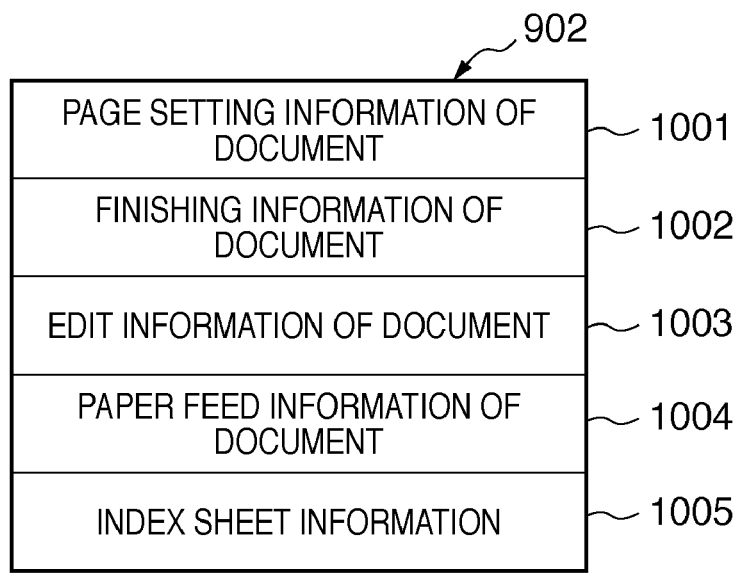
FIG. 10 is a view for explaining in detail the data structure of detailed setting information of the document shown in FIG. 9.

FIG. 10 is a view for explaining in detail the data structure of detailed setting information of the document shown in FIG. 9. As shown in FIG. 10, a field 1001 included in the field 902 stores page setting information of the document, a field 1002 stores finishing information of the document, and a field 1003 stores edit information of the document. A field 1004 stores paper source information of the document, and a field 1005 stores index sheet information.

Figure 11:
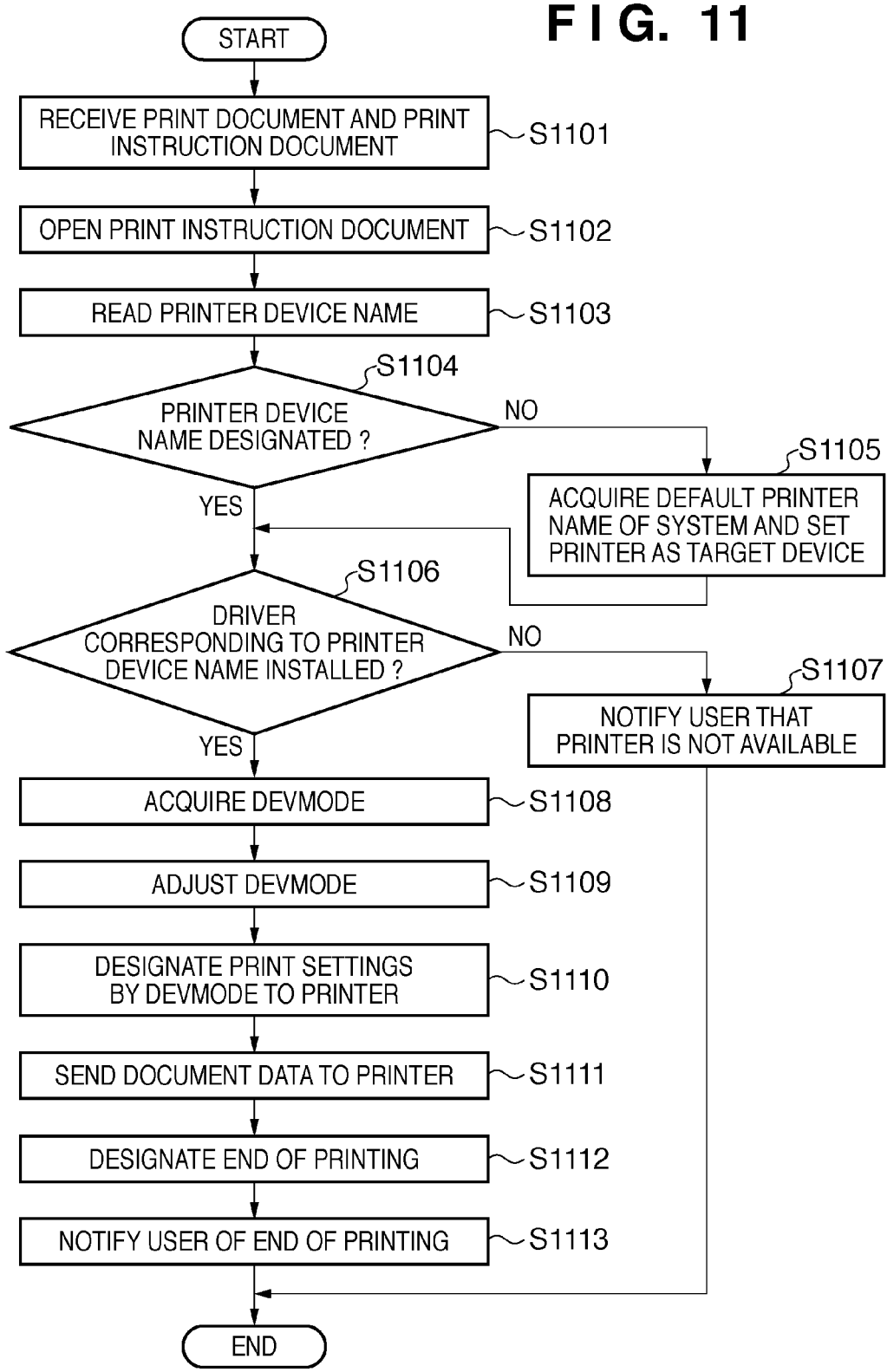
FIG. 11 is a flowchart showing a processing sequence by the bookbinding application and electronic document despooler when the document processing system prints out a document.

The sequence of book file output processing in the document processing system will be explained in detail. FIG. 11 is a flowchart showing a processing sequence by the bookbinding application and electronic document despooler when the document processing system prints out a document. The bookbinding application and electronic document despooler will be referred to as a system at once. The CPU invokes the system to execute respective steps in FIG. 11.

In step S1101, the bookbinding application reads out and receives, from the hard disk or the like, both a print document and print instruction document corresponding to a book file in accordance with a user instruction. The print instruction document is an electronic document which accompanies a print document to be printed and describes information (setting values in printing) on how to print a target print document. Even when the print document and print instruction document are integrated into one document file, the print instruction document can be processed in the same way. The user can change the contents of the print instruction document by, for example, changing print settings in the user interface window shown in FIG. 7.

Figure 12:
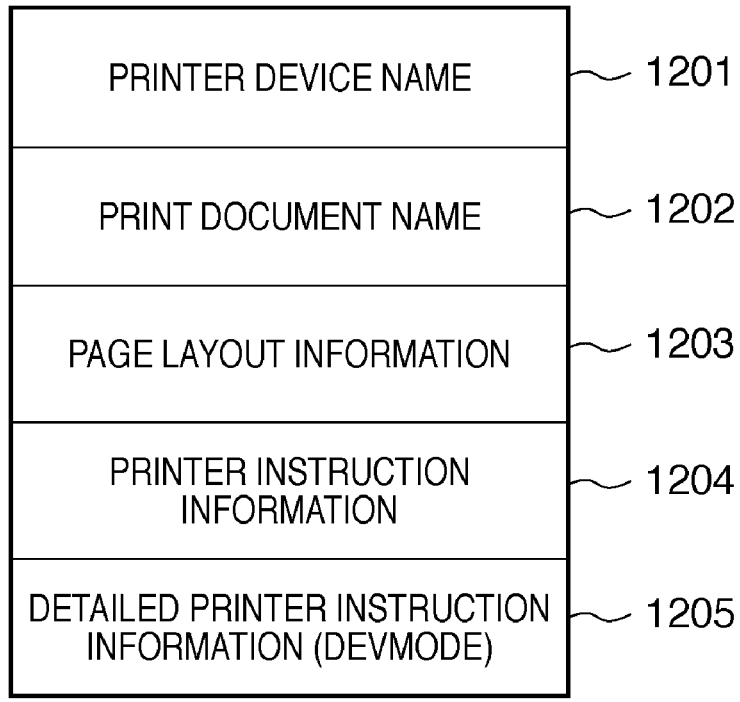
FIG. 12 is a view showing the overall structure of a print instruction document.
Figure 13:
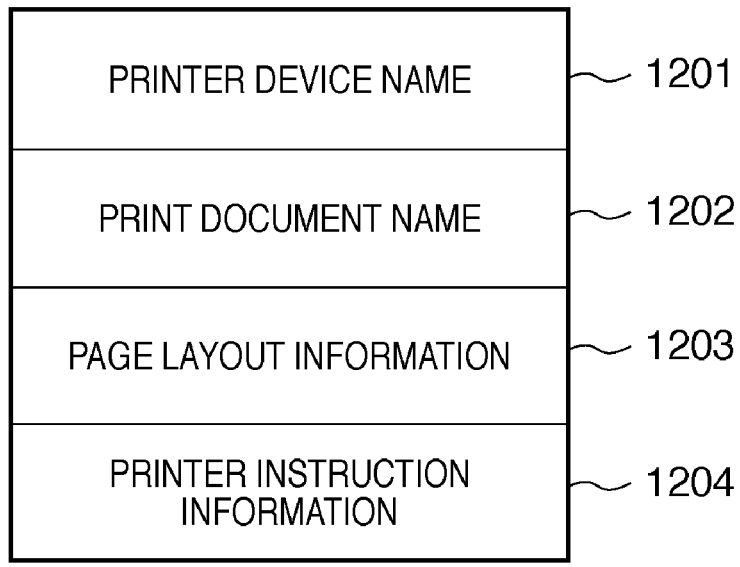
FIG. 13 is a view showing another example of the overall structure of the print instruction document.

The print instruction document will be explained. FIG. 12 is a view showing the overall structure of the print instruction document. As shown in FIG. 12, the print instruction document includes fields 1201 to 1205. The field 1201 stores the name of a printer device used in output, and the field 1202 stores the name of a print document to be printed. The field 1203 stores page layout information describing the layout and order of pages to be printed in the print document. The field 1204 stores printer instruction information describing an instruction to the printer used in output. The field 1205 stores detailed printer instruction information (DEVMODE). The field 1205 exists only when detailed printer settings are necessary. When no detailed printer setting is necessary, the print instruction document may also have a structure as shown in FIG. 13.

FIG. 14 is a view showing an example of page layout information. A field 1401 stores a page layout representing the number of pages whose data are to be printed on the surface of one sheet. As the page layout, the field 1401 stores one page/sheet, two pages/sheet, four pages/sheet, 16 pages/sheet, or the like. A field 1402 stores layout order information representing a layout when printing data of a plurality of pages on the surface of one sheet. As the layout order, the field 1402 stores "from left to right", "from right to left", "from left to bottom", "from right to bottom", or the like. A field 1403 stores stamp information for rendering an image or the like on a sheet. As the stamp information, the field 1403 stores "Secret", "Confidential", or the like. A field 1404 stores the number of copies. A field 1405 stores information which designates a location where printed materials are bound. A field 1406 stores information of a gutter set for printed materials. A field 1407 stores information of a margin set around each page. A field 1408 stores imposition method information representing the number and imposition of page layout data to be printed on one sheet. As the imposition method information, the field 1408 stores 1×1 imposition, N×N imposition, saddle stitching, case binding, quarto, or the like. A field 1409 stores opening direction information which designates the direction in which a created book is opened when saddle stitch imposition or case bind imposition is executed with settings associated with the field 1408. As the opening direction information, the field 1409 stores left opening, right opening, upward opening, downward opening, or the like. A field 1410 stores separate binding information which designates the number of sheets to be bound separately when saddle stitching is set.

In the embodiment, the bookbinding application 104 applies the above-described page layout information to document data (book file) to be printed that is designated by a print document name stored in the field 1202. Further, the bookbinding application sends page layout information-applied document data via the electronic document despooler 105 and OS to a printer driver having a printer device name stored in the field 1201.

FIG. 15 is a view showing an example of detailed settings of detailed printer instruction information shown in FIG. 12. A field 1501 stores delivery method item information which designates how to process a delivered sheet. As the item information, the field 1501 stores staple & sort, saddle stitch & staple, or the like. A field 1502 stores print method item information which designates single-sided printing, double-sided printing, or the like. A field 1503 stores paper source item information which designates a unit for feeding sheet. As the item information, the field 1503 stores an upper cassette, lower cassette, manual feed tray, or the like. A field 1504 stores the resolution item information which designates a resolution. As the item information, the field 1504 stores high resolution "fine", normal resolution "normal", or the like. In the embodiment, the above-described settings are made for a printer specified by a printer device name stored in the field 1201, and then data is sent to the printer and printed. FIG. 16 is a view showing an example of the structure of instruction information when the system actually instructs the printer to print. The instruction information shown in FIG. 16 is, e.g., DEVMODE in a Microsoft Windows® OS. The DEVMODE is a structure which stores contents settable by the properties of a printer driver in the Windows® OS, and is provided by the OS. Upon receiving a print instruction, the printer driver refers to the DEVMODE to generate a print instruction to be transmitted to the printer. The printer driver generates a print instruction to cause the printer function as described in the DEVMODE, and transmits the print instruction to the printer. In order to explain a document processing system which runs on the Windows® OS, the embodiment will exemplify the DEVMODE. However, as for device-dependent functions, like a printer function, an OS generally includes a mechanism for implementing processing corresponding to a device function. Hence, the present invention is also applicable to another OS.

A field 1601 stores a device name representing the name of a printer used in output. A field 1602 stores a DEVMODE version which is an identifier for identifying the version of the DEVMODE. A field 1603 stores DEVMODE size information representing the respective sizes of common and expansion areas of the DEVMODE, and its total size. A field 1604 stores output paper size information. A field 1605 stores paper orientation information representing a paper feed orientation (portrait/landscape). A field 1606 stores color mode information which designates color or monochrome printing of data when the printer is a color printer. A field 1607 stores page layout information representing the number of pages whose data are to be printed on one surface of one sheet. As the page layout information, the field 1607 stores one page/sheet, two pages/sheet, four pages/sheet, 16 pages/sheet, or the like. A field 1608 stores binding location information which designates a location where printed materials are bound. A field 1609 stores gutter information set for printed materials. The field 1609 is sometimes processed in association with a delivery method stored in a field 1611. A field 1610 stores print method information which designates single-sided printing, double-sided printing, or the like. The field 1611 stores delivery method information which designates how to process a delivered sheet. As the delivery method information, the field 1611 stores stapling, sorting, or the like. A position to be processed is sometimes associated with binding location information stored in the field 1608. A field 1612 stores the number of copies.

The DEVMODE is formed from a common area (Public area) whose specification is laid open to the public, and an expansion area (Private area) which can be set for each printer. More specifically, items such as the printer name, DEVMODE version, DEVMODE size, paper, paper orientation, color mode, and the number of copies belong to the common area. These items can be controlled by common procedures for all drivers under the Windows® OS. FIG. 16 simply shows only relevant items.

Referring back to FIG. 11, upon receiving a print document and print instruction document in step S1101, the bookbinding application opens the print instruction document in step S1102.

In step S1103, the bookbinding application reads a printer device name (stored in the field 1201) designated by the print instruction document.

In step S1104, the bookbinding application determines whether the print instruction document designates a printer device name. If the bookbinding application determines that the print instruction document does not designate a printer device name, it acquires a default printer name registered in a predetermined storage location, and sets a printer device corresponding to the printer name as an output target in step S1105. If the bookbinding application determines that the print instruction document designates a printer device name, the process advances to step S1106.

In step S1106, the bookbinding application determines whether a driver corresponding to the printer device (target printer) determined as an output target has been installed. If the bookbinding application determines that no driver has been installed, it notifies in step S1107 the user that the printer is not available, and ends the process. If the bookbinding application determines that the driver has been installed, the process advances to step S1108.

In step S1108, the bookbinding application acquires the DEVMODE of the target printer from the print instruction document. If the print instruction document does not include the DEVMODE of the target printer, the bookbinding application acquires it from the driver of the target printer.

In step S1109, the bookbinding application performs adjustment processing (to be described below) to rewrite the DEVMODE. After adjusting the DEVMODE, the bookbinding application issues in step S1110 a print instruction based on contents described in the DEVMODE to the printer device via the printer driver in order to send an instruction to the printer.

In step S1111, the electronic document despooler rasterizes the contents of the print document on the basis of rasterization instruction information described in the print instruction document, and sends the rasterized data to the printer device.

In step S1112, the bookbinding application notifies the printer that it has sent all print data (print instruction and rasterized data). After all print data are printed, the bookbinding application notifies the user of a message to this effect in step S1113, and ends the process.

Processing to generate a book file and the above-described print instruction document by the bookbinding application 104 in accordance with the performance of a printer selected by the user will be explained.

First, the user instructs the bookbinding application 104 to select a printer and execute printing. Then, the bookbinding application 104 inquires print function attribute information and print performance attribute information of the printer driver via the electronic document despooler 105 using a printer driver SDK API.

The print function attribute information is information representing print functions which can be executed by the print apparatus and print functions which can be designated by the printer driver. More specifically, the print function attribute information is function information which can be designated by the printer driver, such as double-sided printing, N-UP printing, stapling, punching, Z-folding, saddle stitching, and case binding. The print performance attribute information is information representing the range of print functions which can be designated by the OS and printer driver in print function information. More specifically, print performance attribute information is printer driver performance information such as the printable paper size, the paper type, the maximum designable number of copies, the number of gray levels in monochrome printing, and the color space and color profile in color printing.

The printer driver notifies the bookbinding application 104 of print function attribute information and print performance attribute information as return values to a printer driver SDK API function called from the bookbinding application 104 via the electronic document despooler 105.

The bookbinding application 104 collates information notified from the printer driver with print settings made by the user. When a function not provided by the printer is set or a function for which it is uncertain whether the printer can provide it is set, the bookbinding application temporarily changes or cancels the print setting. Based on the remaining print settings, the bookbinding application creates a book file and print instruction document, and transfers them to the electronic document despooler 105.

The electronic document despooler 105 issues various print attribute settings and a print instruction to the printer driver using the printer driver SDK API. The electronic document despooler 105 may also issue print settings and a print instruction to the printer driver using a Windows® SDK API provided by the GDI (Graphical Device Interface) of a general OS. Print settings using the Windows® SDK API mean, for example, print settings using the DEVMODE structure.

When the electronic document despooler 105 issues various print attribute settings and a print instruction using the printer driver SDK API, the printer driver generates a print control instruction on the basis of the print attribute settings. When the electronic document despooler 105 issues print settings and a print instruction using the general Windows® SDK API, the printer driver generates a print control instruction on the basis of print attribute settings and a print instruction function called from the OS. As a result, the printer can print out a target document.

The printer driver SDK API is an arbitrarily programmable function or an application program interface (API) in the form of data. The embodiment uses the printer driver SDK API as a means (unit) for notifying various kinds of information and various data between an application program and a printer driver program.

As described above, the DEVMODE which can be designated by the SDK API is formed from an area (to be referred to as a common area hereinafter) which is laid open to the public and is common among manufacturers, and an expansion area which can be set for each printer. Only when a printer driver corresponding to a printer deals with the printer driver SDK API, the bookbinding application 104 can acquire print function attribute information and print performance attribute information from the printer driver. Only when a corresponding printer driver deals with the printer driver SDK API, the bookbinding application 104 can issue a print instruction to the printer using the DEVMODE structure. For other printer drivers, the bookbinding application 104 can process only print function attribute information and print performance attribute information expressed by the common area of the DEVMODE.

Thus, when a printer incompatible with the printer driver SDK API is used, the bookbinding application 104 cannot issue a print instruction matching the printer performance. In this case, the user needs to directly make settings in the printer driver. Some functions cause an error when a common function is repetitively set in the bookbinding application 104 and printer driver. For such a function, it is necessary to directly instruct the printer driver of the function, and cancel the print setting in the bookbinding application.

Figure 17:
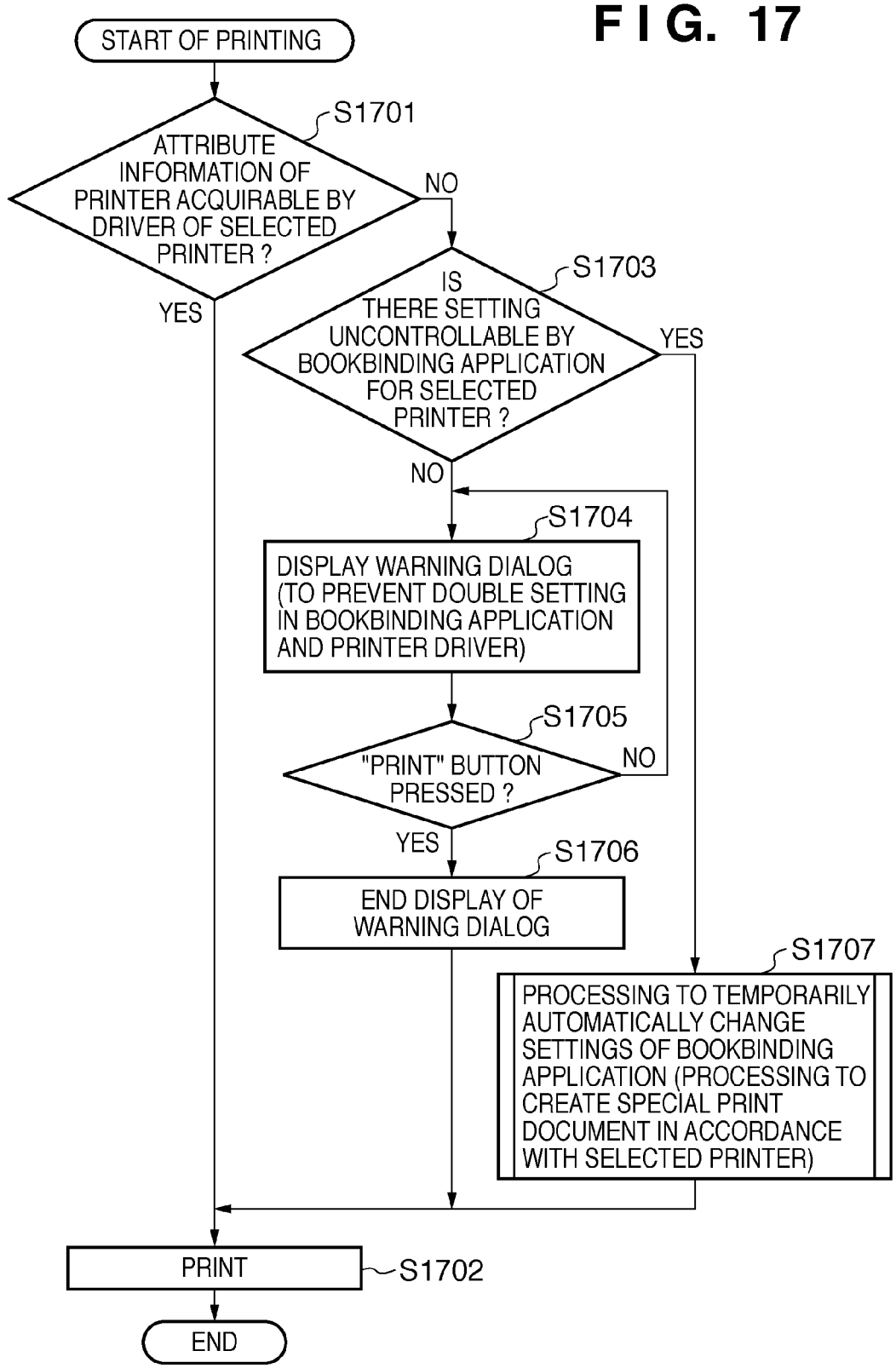
FIG. 17 is a flowchart showing the sequence of print processing in the embodiment.

FIG. 17 is a flowchart showing the sequence of print processing according to the embodiment. According to the flowchart shown in FIG. 17, print processing can be done even when the bookbinding application 104 uses a printer driver incompatible with the printer driver SDK API.

The user instructs the bookbinding application 104 to select a printer and execute printing. In step S1701, the bookbinding application determines whether the driver of the selected printer can acquire function attribute information and performance attribute information of the printer using the printer driver SDK API. More specifically, the bookbinding application transmits a DEVMODE describing the selected printer driver name to a determination API for determining whether the selected printer is compatible with the printer driver SDK API. If the determination API replies that the selected printer is compatible, the bookbinding application determines that the printer driver can acquire function attribute information and performance attribute information (YES in S1701). If YES in S1701, the process advances to step S1702 to perform general book file print processing described with reference to FIG. 11. Note that the API is not limited to the printer driver SDK API, but may also be a Windows® API.

If NO in S1701, the bookbinding application 104 determines whether print settings made via the bookbinding application setup window include a setting (incompatible setting) which cannot be controlled or designated for the selected printer (S1703). More specifically, the bookbinding application 104 determines whether print settings made by the user include a setting item (e.g., a finishing setting such as punching, stapling, or saddle stitching) uncontrollable by only the common area of the DEVMODE. Finishing is processing executed for printed sheets. For example, when the print settings include the designation of finishing, the bookbinding application 104 determines that the print settings includes a setting uncontrollable for the selected printer. If the bookbinding application 104 determines in step S1703 that the print settings do not include such a setting (i.e., the print settings include only settings controllable for the selected printer), the process advances to step S1704 to display a warning message shown in FIG. 18.

Figure 18:
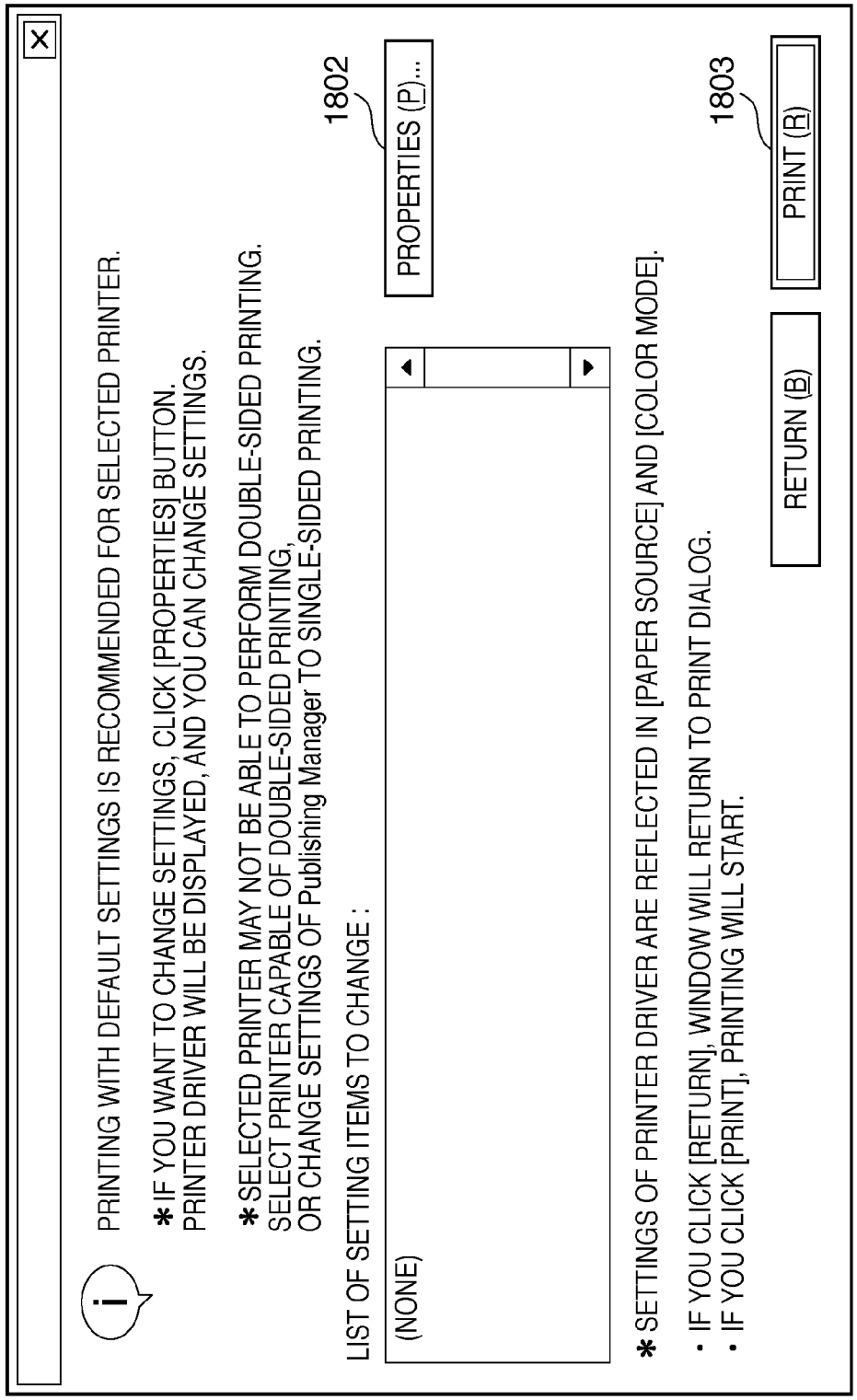
FIG. 18 is a view showing an example of a warning message displayed in step S1704.

FIG. 18 is a view showing an example of the warning message displayed in step S1704. The warning message is displayed to prevent double setting in the bookbinding application 104 and printer driver properties (prevent making the same setting in both of them). The user can press a button 1802 in FIG. 18 to activate the printer properties of a selected printer and restore the settings of the printer driver to default ones. If the user presses a button 1803 to execute printing in step S1705, the process advances to step S1706 to end the display of the warning message shown in FIG. 18, and print the book file.

If the bookbinding application 104 determines in step S1703 that the print settings includes a setting uncontrollable for the selected printer, the process advances to step S1707, and the bookbinding application 104 performs processing to change or cancels some print settings, and create a special print instruction document in accordance with the performance of the selected printer. Then, the book file is printed.

Figure 19:
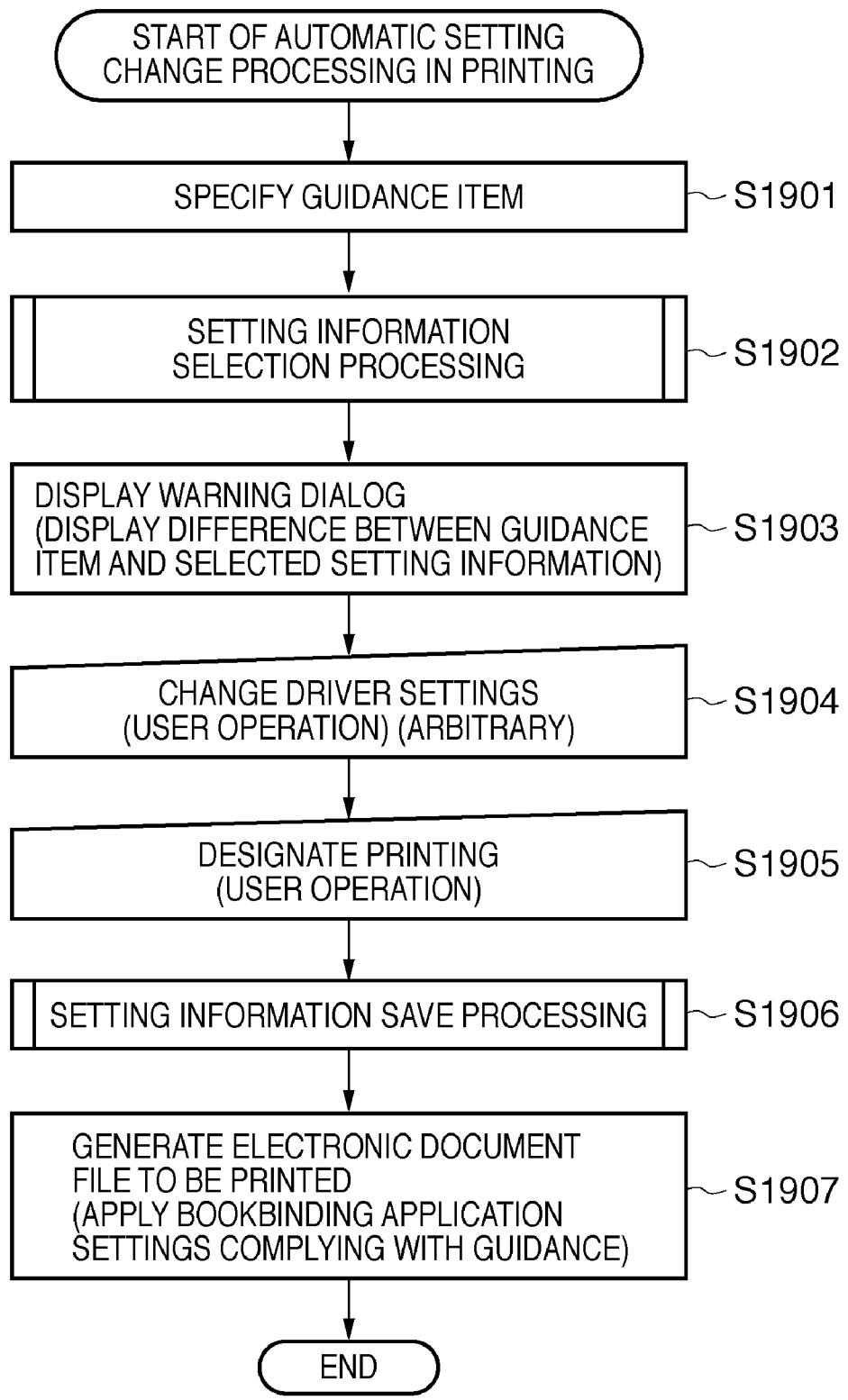
FIG. 19 is a flowchart showing details of the sequence of a process in step S1707.

FIG. 19 is a flowchart showing details of the sequence of the process in step S1707. More specifically, if the bookbinding application determines in step S1703 that the print settings include a setting which cannot be controlled (designated) for the selected printer, the bookbinding application 104 performs processing to change or cancel some print settings, and create a special book file in accordance with the performance of the selected printer.

In step S1901, the bookbinding application specifies a setting item (guidance item) which cannot be designated for the selected printer. More specifically, the bookbinding application specifies, among print settings made by the user, a setting item (e.g., a finishing setting such as punching, stapling, or saddle stitching) which cannot be controlled by only the common area of the DEVMODE.

Figure 20:
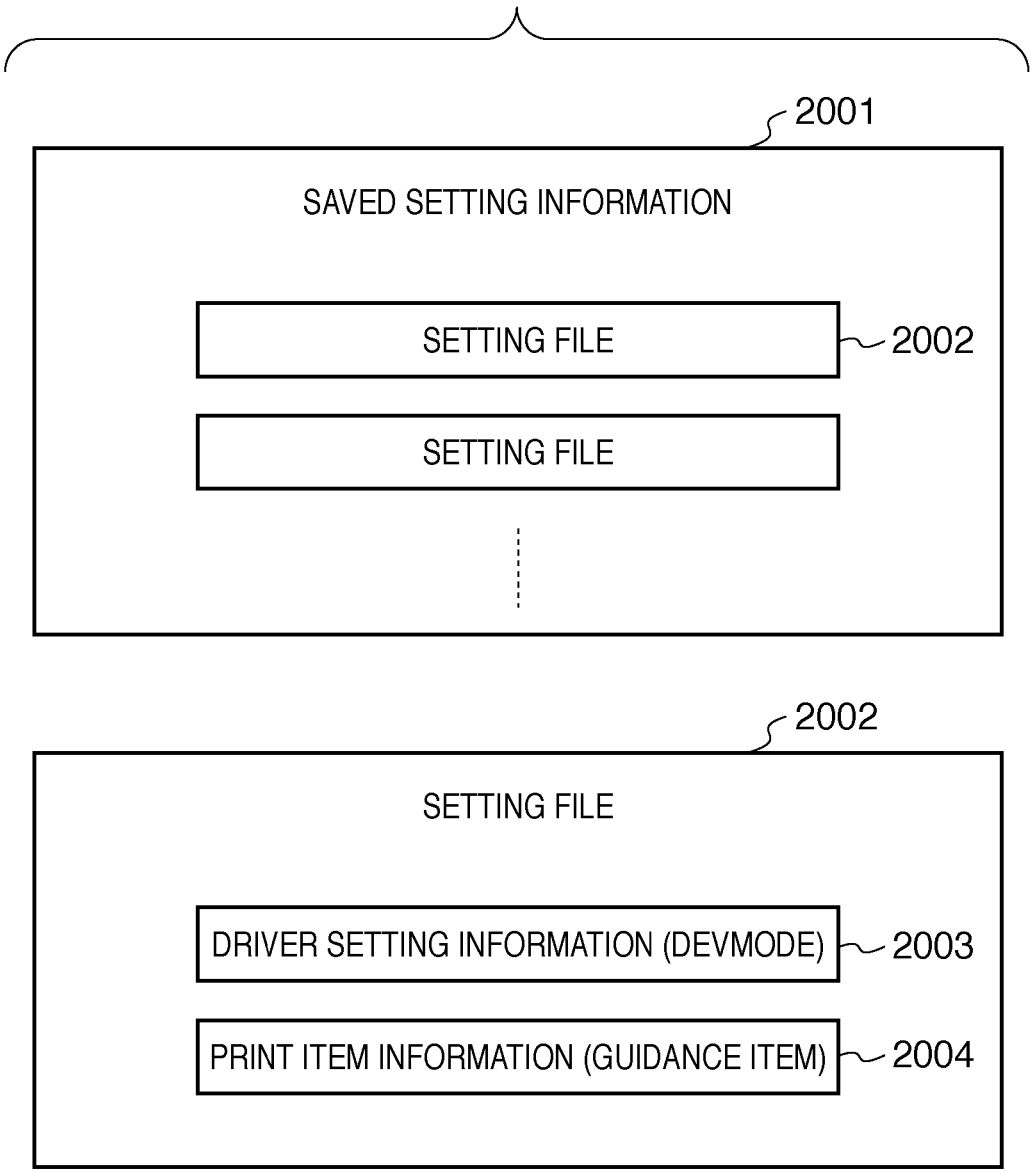
FIG. 20 is a view showing an example of saved setting information.

In step S1902, the bookbinding application selects a DEVMODE used as the initial values of printer driver settings from saved setting information. The saved setting information will be explained. FIG. 20 is a view showing an example of saved setting information 2001. In the embodiment, a setting file 2002 formed from driver setting information 2003 including a DEVMODE, and print item information 2004 including guidance items in save is stored and saved in a storage area such as a memory. A plurality of saved setting files 2002 form the saved setting information 2001. The print item information 2004 includes a setting item (guidance item) which could not be designated to a selected printer among setting items in the bookbinding application when the user printed before.

Figure 21:
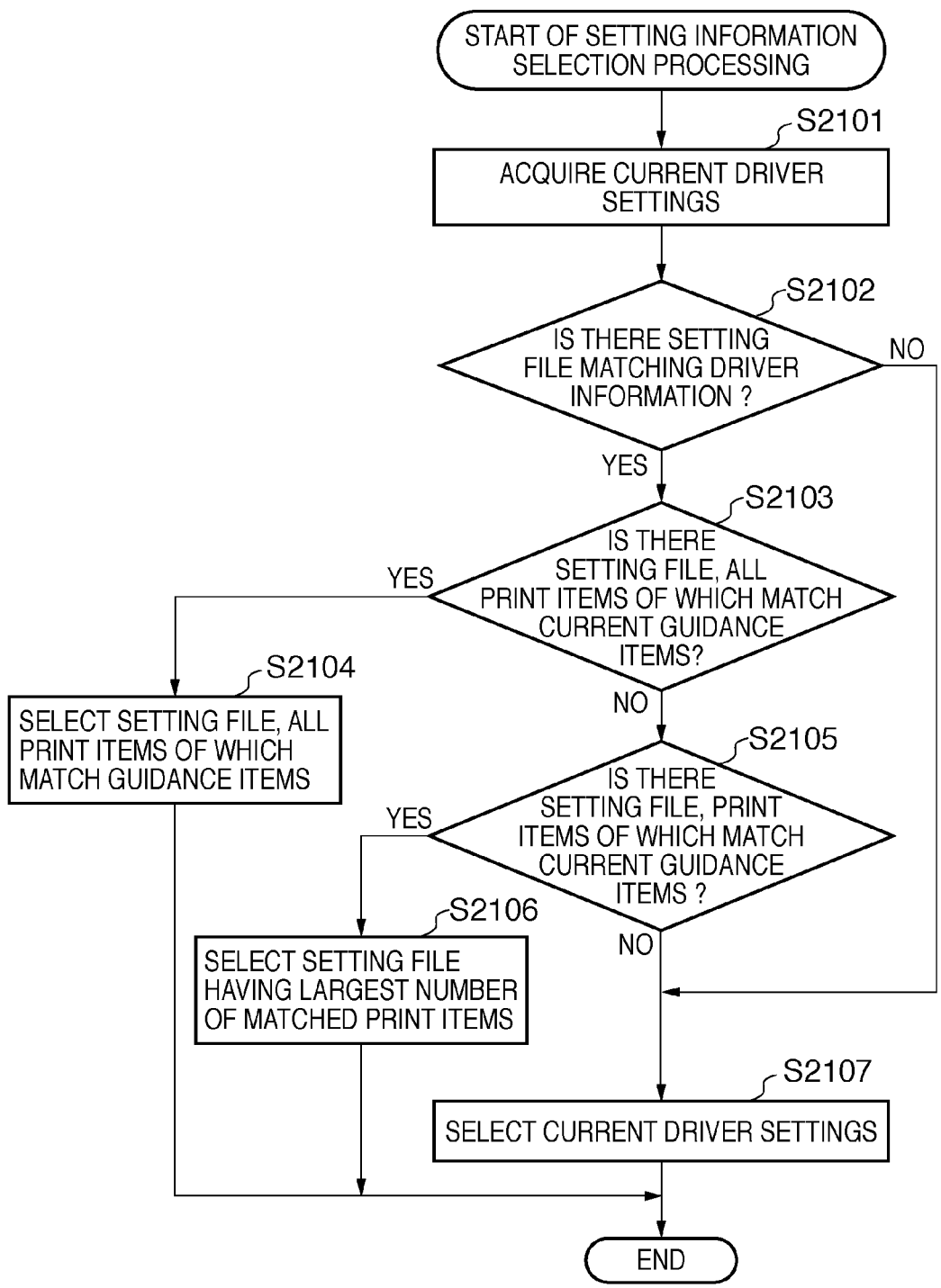
FIG. 21 is a flowchart showing details of the sequence of a process in step S1902.

FIG. 21 is a flowchart showing in detail the sequence of the process in step S1902. In step S2101, the bookbinding application acquires current driver settings (DEVMODE).

In step S2102, the bookbinding application refers to the driver setting information 2003 (DEVMODE) of each of the setting files 2002 saved in the saved setting information 2001. At this time, the bookbinding application compares a printer name (field 1601), DEVMODE version (field 1602), and DEVMODE size (field 1603) in the DEVMODE with those in the current DEVMODE. If one or more setting files having a DEVMODE in which all the three items match those in the current DEVMODE are detected, the process advances to step S2103. If a setting file having a DEVMODE in which all the three items match those in the current DEVMODE is not detected, the bookbinding application determines in step S2107 to use the current DEVMODE as initial values, and ends the process. More specifically, the bookbinding application accepts setting values designated in the current driver, and prints using the accepted driver setting values, and settings compatible with the accepted driver setting values among settings input from the user to the bookbinding application.

In step S2103, the bookbinding application refers to pieces of print item information 2004 (print attribute) in the setting files 2002 determined in step S2102 to have three items matched, and compares the pieces of print item information 2004 with current guidance items. If the bookbinding application determines that there is a setting file 2002, all pieces of print item information of which match the current guidance items, it determines in step S2104 to use the pieces of information of the setting file 2002 as initial values, and ends the process. If the bookbinding application determines that there is no setting file 2002, all pieces of print item information of which match the current guidance items, the process advances to step S2105.

In step S2105, the bookbinding application determines whether there is a setting file which does not include an item absent in current guidance items and includes items matching the current guidance items. If the bookbinding application determines that there is such a setting file, it determines in step S2106 to use, as initial values, pieces of information of a setting file 2002 having a largest number of pieces of print item information that match the current guidance items. Then, the bookbinding application ends the process. If the bookbinding application determines that there is no such setting file, it determines in step S2107 to use the current DEVMODE as initial values, and ends the process. In the above description, even a state in which there is no guidance item is regarded as one guidance item.

Figure 22:
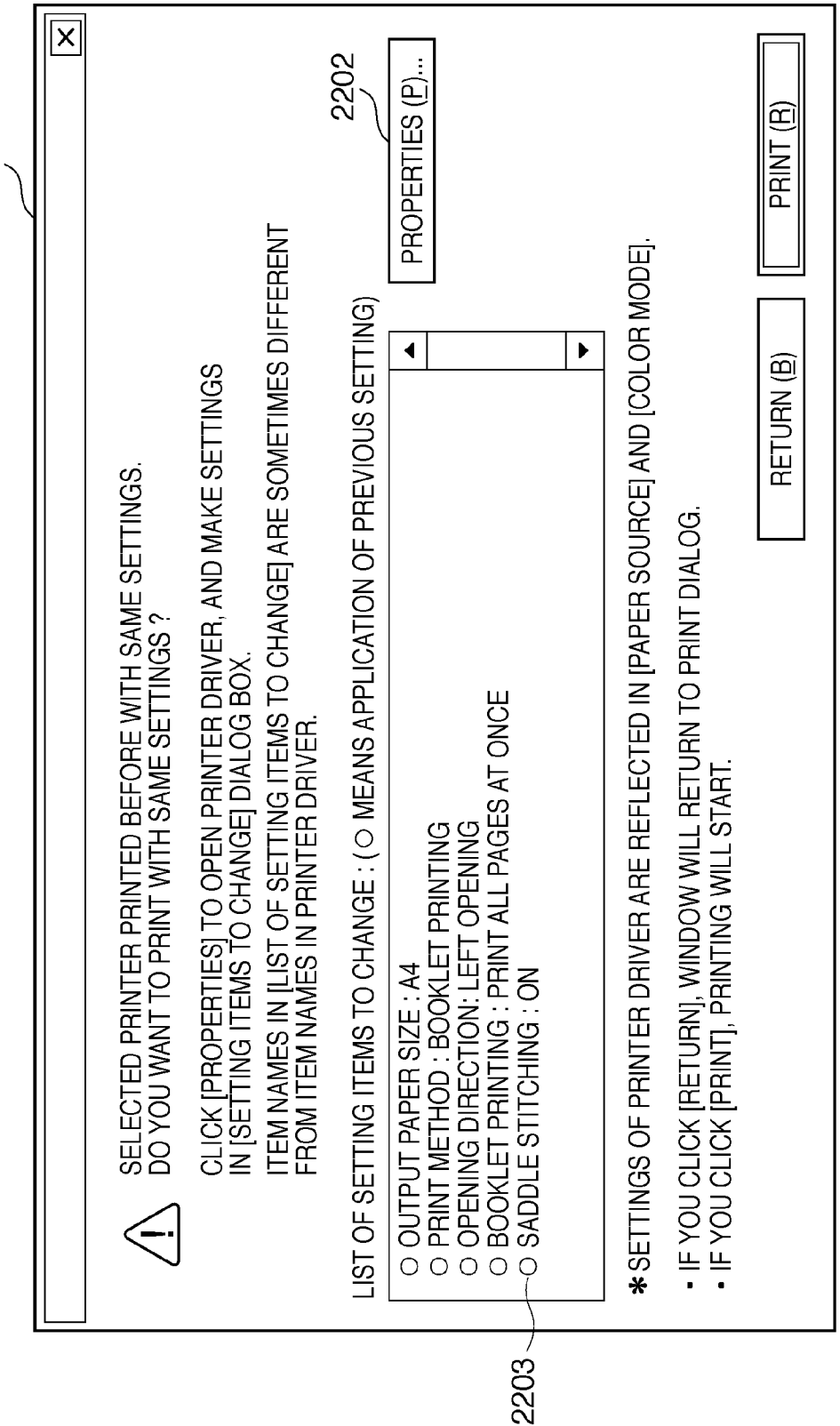
Figure 23:
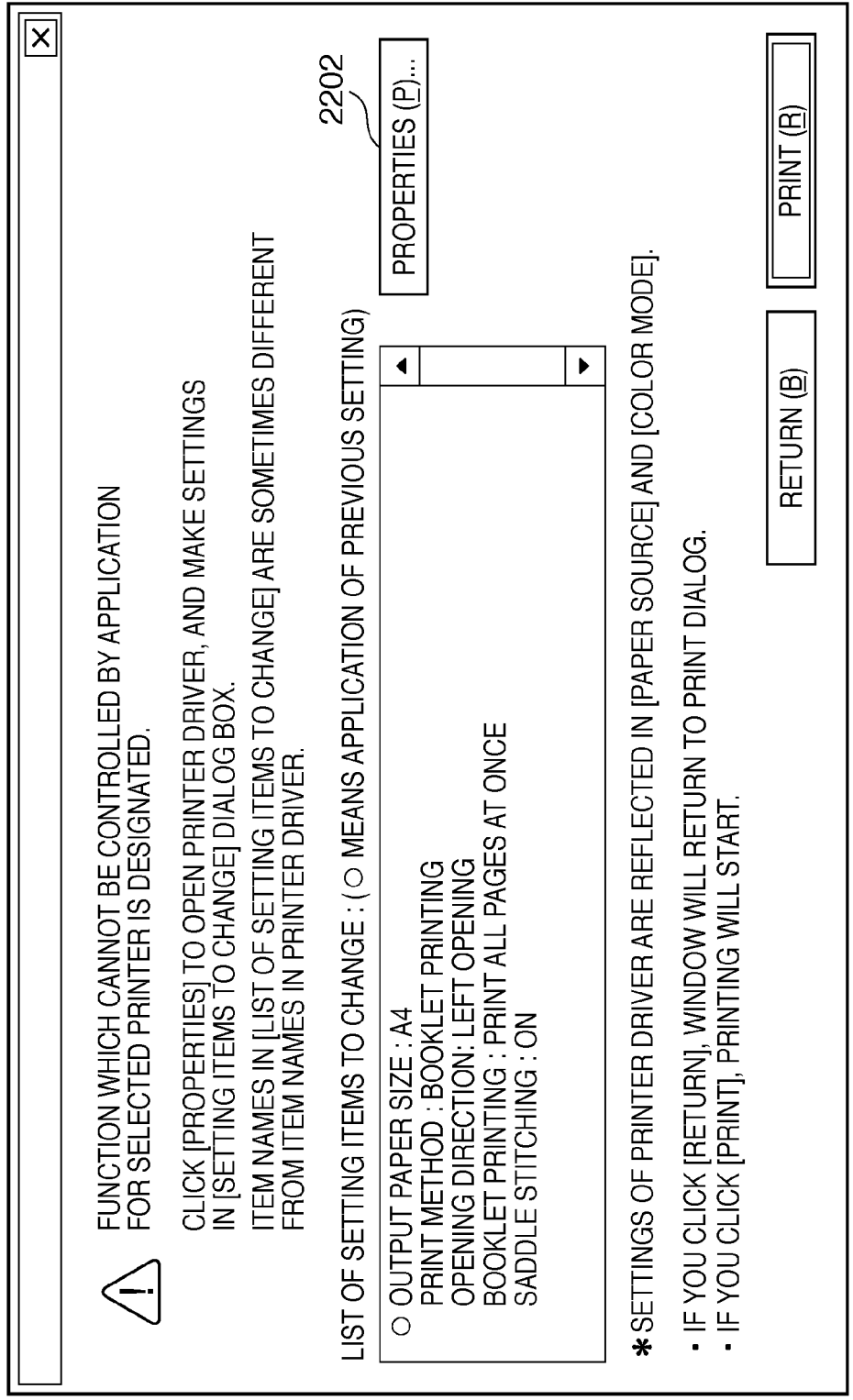

Referring back to FIG. 19, in step S1903, the bookbinding application displays a warning dialog shown in FIG. 22 or 23. FIG. 22 is a view showing an example of the warning dialog displayed in step S1903. A warning dialog 2201 notifies the user that the settings in the bookbinding application 104 include a setting which cannot be designated for a selected printer. The warning dialog 2201 also notifies the user of this setting item as a guidance item.

A display 2203 displays, among guidance items, items which match pieces of setting information of the setting file 2002 determined in step S1902, and shows the difference from the guidance items. FIG. 22 shows a display when a setting file, all the print items of which match current guidance items, is detected in step S2103. When the user selects a button 2202, a printer driver setup window appears while reflecting the setting values of the setting items. If a setting file, all the print items of which match current guidance items, is not detected, a warning dialog as shown in FIG. 23 appears to show the difference from the guidance items. If the user selects the button 2202 in FIG. 23, a printer driver setup window reflecting "A4" in the output paper size item appears.

In the embodiment, guidance items are, for example, setting items (e.g., finishing settings such as punching, stapling, and saddle stitching) which cannot be controlled by only the common area of the DEVMODE.

In step S1904, the bookbinding application activates the printer properties of the selected printer in response to pressing the button 2202 shown in FIG. 22 or 23 by the user. The user can change a setting item to a desired setting value via the activated printer driver setup window.

If the user instructs the bookbinding application to print in step S1905, the bookbinding application ends the display of the warning dialog shown in FIG. 22 or 23, and performs setting information save processing in step S1906 to save current settings.

Figures 24, 25:
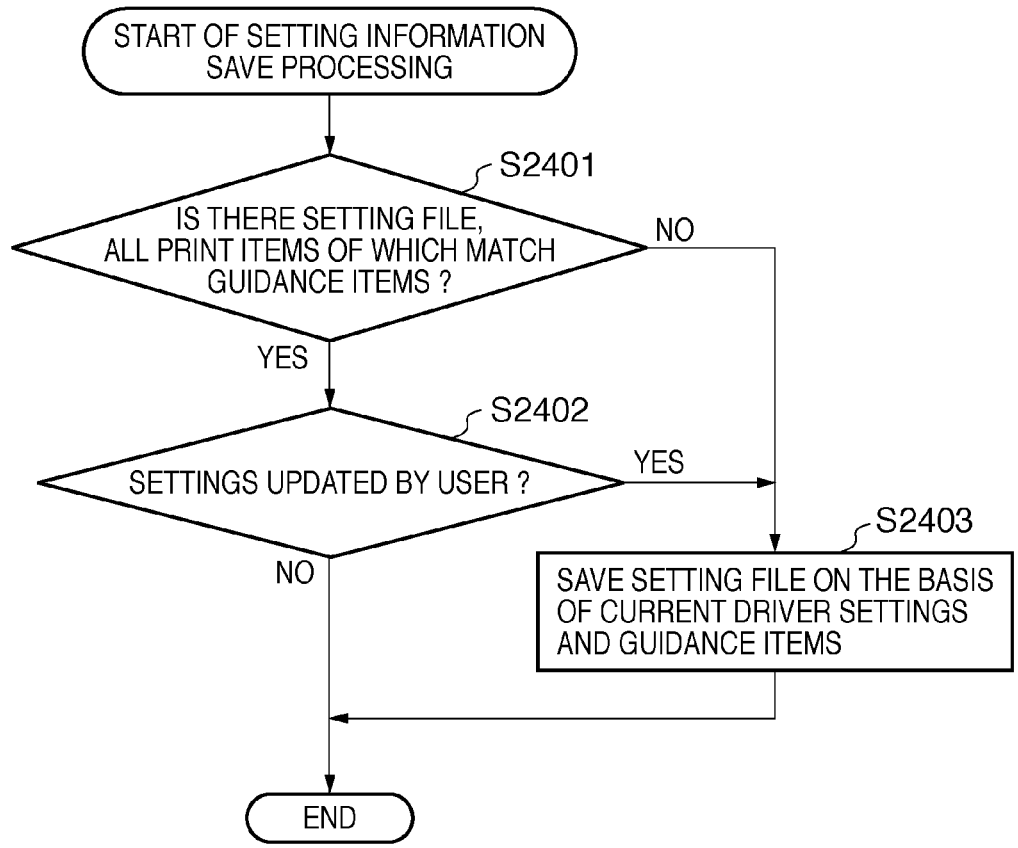
FIG. 24 is a flowchart showing details of the sequence of a process in step S1906.
FIG. 25 is a view showing an example of a work instruction referred to when the user uses the document processing system.

FIG. 24 is a flowchart showing in detail the sequence of the process in step S1906. In step S2401, the bookbinding application determines whether a setting file, all pieces of print item information of which match the current guidance items, has been selected. If the bookbinding application determines that such a setting file has been selected, it determines in step S2402 whether the user has pressed the button 2202 in FIG. 22 to change the settings of the printer driver. If the bookbinding application determines in step S2401 that no such setting file has been selected, the process advances to step S2403, and the bookbinding application newly creates a setting file 2002 on the basis of the current DEVMODE and current guidance items, adds it as saved setting information, and ends the process.

If the bookbinding application determines in step S2402 that the user has changed the settings, the process advances to step S2403, and the bookbinding application creates a setting file 2002 on the basis of the current DEVMODE and current guidance items, and updates the saved setting information. If the bookbinding application determines in step S2402 that the user has not changed the settings, it ends the process without saving setting information. The case where it is determined that the user has not changed the settings is a case where the user neither presses the button 2202 shown in FIG. 22 nor changes the settings of the printer driver.

Referring back to FIG. 19, in step S1907, the bookbinding application changes or cancels some setting values set in the bookbinding application setup window, and generates a print instruction document in accordance with the changed print settings (setting values). For example, some print settings are setting items which cause an error in an output result if they are set repetitively in the bookbinding application 104 and printer driver. For example, if imposition for "saddle stitch" is set in the bookbinding application 104 and the same setting is also made in the printer driver, the settings overlap each other. Then, saddle stitching imposition is executed by the bookbinding application 104 and further by the printer driver, so the user cannot obtain an output result he wants. To prevent this problem, according to the embodiment, some print settings in the bookbinding application 104 are changed or canceled in step S1907.

A concrete example in which the user makes settings in the bookbinding application and printer driver in order to obtain a target product when a printer incompatible with the bookbinding application is used in the document processing system will be explained.

FIG. 25 is a view showing an example of a work instruction referred to when the user uses the document processing system. An operation by the user for the bookbinding application and printer driver in order to obtain a product described in the work instruction when there is a saddle stitching work instruction as shown in FIG. 25 will be described.

Figure 27:
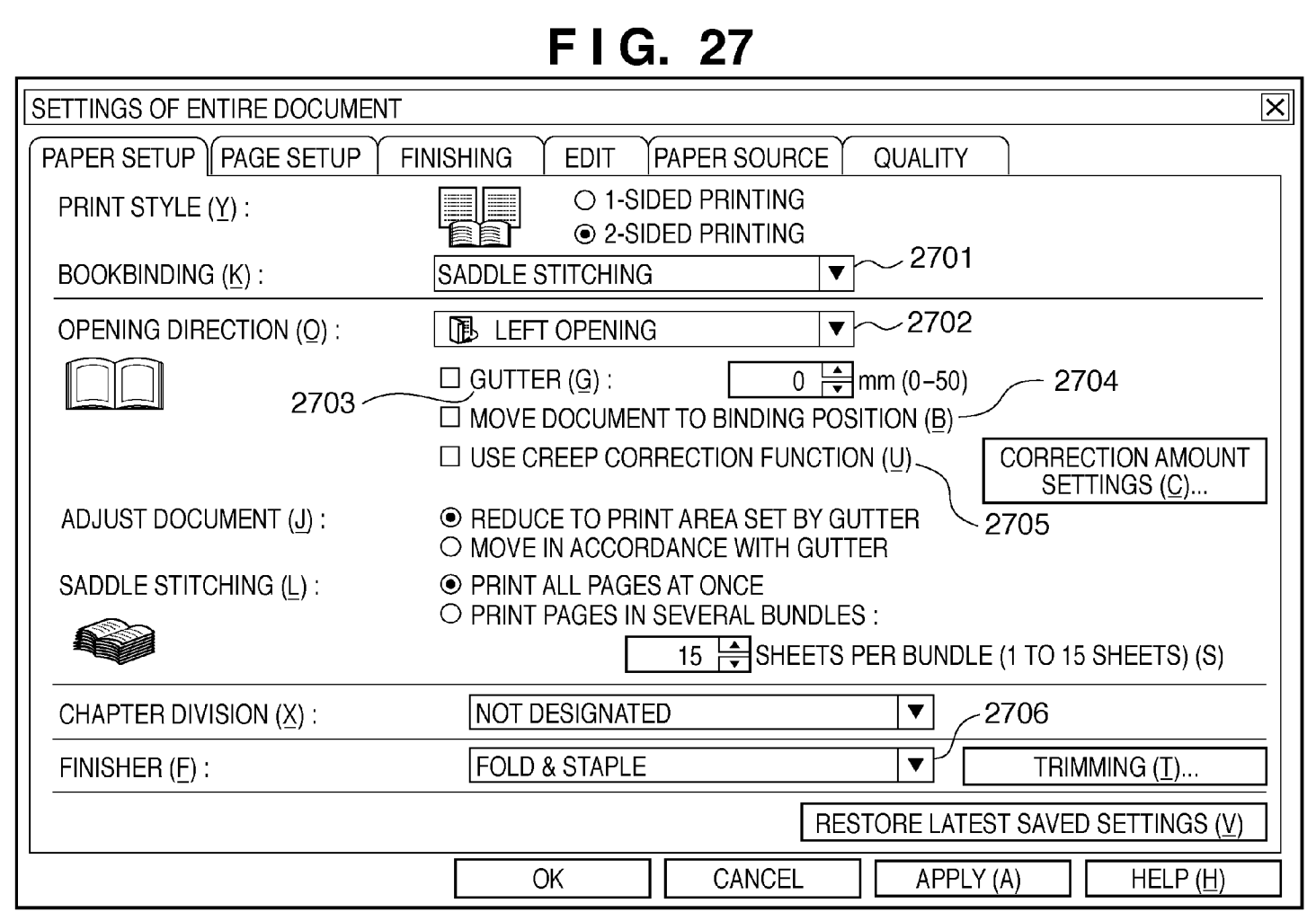

In accordance with the work instruction, the user makes document layout settings and print settings for the printer in the setup window of the bookbinding application 104 as shown in FIGS. 26 and 27. Only setting items relevant to this example will be explained. The user designates a paper size for use in printing in an area 2601 shown in FIG. 26. In FIG. 26, A3 is set. The user designates a paper orientation in printing in an area 2602, and "landscape" is designated. The user designates the layout and print order (imposition type) of document pages in an area 2603. In FIG. 26, "saddle stitching" is selected. When the user selects "saddle stitching", imposition is executed by ensuring an area for arranging two document pages on one sheet, and laying out document pages so as to collate printed sheets upon saddle stitching.

Then, the user makes detailed settings and printer settings in the window of FIG. 27. The user designates a bookbinding method in an area 2701 shown in FIG. 27. In FIG. 27, "saddle stitching" is selected. The user designates the opening direction of a book in an area 2702. In FIG. 27, "left opening" is selected on the assumption that the book is opened to left. The user can make detailed document layout settings in areas 2703, 2704, and 2705. The user can designate a gutter in the area 2703. In the area 2704, the user can designate whether to move document data close to the binding side of the book. In the area 2705, the user can designate whether to use a creep correction function. In an area 2706, the user designates whether to perform "saddle stitch & staple" by a post-processing apparatus accessory to the printer. If the user selects "fold & staple", processes up to "saddle stitch & staple" can be done to output the result to the printer.

In this manner, the user makes, in the bookbinding application, layout settings (e.g., document page order) for the book file, and function settings (e.g., stapling) for the printer. Then, the bookbinding application generates a print instruction document including page layout information and printer instruction information. As described in step S1907 shown in FIG. 19, the bookbinding application changes or cancels some print settings, and generates a print instruction document in accordance with the changed print settings.

FIGS. 28 and 29 are views showing page layout information and printer instruction information in a print instruction document before change. FIGS. 30 and 31 are views showing page layout information and printer instruction information in a changed print instruction document.

In the embodiment, the printer driver designates bookbinding-related imposition processing (i.e., rendering processing to lay out a document and pages for saddle stitch printing), and booklet finishing by the printer (e.g., saddle stitching by an in-line finisher). As shown in FIGS. 28 to 31, all bookbinding-related print setting items in the bookbinding application are changed to OFF.

For example, items "binding location", "imposition", "opening direction", and "separate binding" with asterisks in page layout information shown in FIG. 30 are changed to OFF. As for "imposition", "1×1" means that the setting is OFF. The user sets bookbinding-related imposition processing in printer driver properties to cause the printer driver to perform imposition processing. In the bookbinding application 104, it is necessary not to make these page layout settings for document data (book file) to be transferred to the printer driver for printing. If the bookbinding application 104 does not cancel the opening direction setting, separate binding setting, and imposition setting in page layout information, the application also creates print data having the page layout settings and transfers it to the printer driver. The printer driver further executes bookbinding imposition for the print data in accordance with the settings of the printer driver. The print data undergoes bookbinding imposition twice, and the user cannot obtain an output result he wants. However, the embodiment solves this problem by changing the print instruction document in the above-described way.

A setting operation by the user to the printer driver will be explained with reference to FIG. 8. In the area 801 of FIG. 8, the user designates, as a printer (printer driver) used in printing, a device (MFP-1) incompatible with the bookbinding application 104 in accordance with a work instruction. If the user presses the OK button, the bookbinding application 104 performs print processing according to the flowchart shown in FIG. 17.

Assume that the bookbinding application 104 determines in step S1703 that the selected printer has a print setting uncontrollable by the bookbinding application. Further, assume that the driver of the same device (MFP-1) printed before with settings for which the same guidance was displayed. In this case, a DEVMODE used in previous printing is automatically applied, and the warning dialog shown in FIG. 22 appears. This DEVMODE is one included in a setting file, all pieces of print item information of which match guidance items, as described in step S2104 of FIG. 21. When the warning dialog shown in FIG. 22 appears, the user may also directly execute printing. The user may also press the button 2202 in the warning dialog to activate the printer properties of the printer driver, and change the settings of the printer driver while referring to guidance items designated in the warning dialog.

Assume that the selected printer printed before with the driver of the same device (MFP-1) with the same settings of only some guidance items. In this case, the DEVMODE of a setting file having a largest number of print items matching guidance items is automatically applied from saved setting information, and the warning dialog shown in FIG. 23 appears. When the warning dialog appears, the user presses the button 2202 in it to activate the printer properties of the printer driver. The user changes settings insufficient in the current settings in accordance with the guidance items of the warning dialog, and then executes printing.

Assume that the selected printer has not printed before with the driver of the same device (MFP-1). Even in this case, the DEVMODE of a setting file having a largest number of print items matching guidance items is automatically applied from saved setting information, and the warning dialog shown in FIG. 23 appears. When the warning dialog appears, the user presses the button 2202 in it to activate the printer properties of the printer driver. While referring to guidance items designated in the warning dialog, the user changes the settings of the printer driver, and then executes printing.

By this sequence, the operation to make saddle stitch settings in the printer driver is complete. As concrete settings of the printer driver, the output paper size is A4, the print method is booklet printing, the opening direction is left opening, and stapling is ON. A DEVMODE for making these printer driver settings is saved in the print instruction.

When the user executes printing, the bookbinding application 104 performs the process in step S1907 of FIG. 19 (i.e., processing to change or cancel part of the print instruction document), and executes printing. In the embodiment, page layout information shown in FIG. 28 changes to one as shown in FIG. 30, and printer instruction information shown in FIG. 29 changes to one shown in FIG. 31. The bookbinding application 104 notifies the electronic document despooler 105 of a print instruction including the page layout information and printer instruction information changed as shown in FIGS. 30 and 31. The electronic document despooler 105 performs print processing as described with reference to FIG. 11. More specifically, the electronic document despooler 105 refers to detailed printer instruction information (field 1205) saved in the received print instruction, and creates a DEVMODE for instructing a selected printer (MFP-1 in this case) on settings designated in the print instruction. FIG. 32 is a view showing an example of a DEVMODE generated by the bookbinding application 104 in accordance with the print instruction including the page layout information and printer instruction information shown in FIGS. 30 and 31.

For comparison, FIG. 33 shows a DEVMODE generated by the electronic document despooler 105 when performing general print processing using a device compatible with the bookbinding application 104. The DEVMODE shown in FIG. 33 is generated in accordance with a print instruction generated without performing the process in step S1707 of FIG. 17.

As described above, according to the embodiment, even when a printer which cannot be finely controlled by the bookbinding application 104, that is, is incompatible with the bookbinding application 104 is used, the same output result as that obtained when a compatible printer is used can be obtained.

In the above description, the saved setting information 2001 may also be saved in a storage area in the print control apparatus 100, or in, for example, a shared file server connected to the print control apparatus 100 via a network interface. The saved setting information 2001 may also be saved in an external memory commonly used by a plurality of users of the print control apparatus 100. This arrangement allows bookbinding applications 104 running in a plurality of print control apparatuses 100 to share the saved setting information 2001. This arrangement also allows bookbinding applications 104 used by a plurality of users to share the saved setting information 2001. By sharing saved setting information between a plurality of users, a chance to save settings increases. As a result, in step S2103, a chance to refer to a setting file, all pieces of the print item information 2004 of which match the current guidance items, increases. This can further improve user friendliness.

In the embodiment, the saved setting information 2001 may also be configured to impose an access limitation "Read Only" on the saved setting information 2001, and allow only an administrator to rewrite settings. In this case, it can be prevented to save setting contents which have erroneously been set by the user and used to print. The document processing system in the embodiment may also be formed from a plurality of devices (e.g., a host computer, interface device, reader, and printer), or an apparatus (e.g., a copying machine or facsimile apparatus) formed by a single device.

In the embodiment, a storage medium (or recording medium) which stores the codes of the program (print control program) of software for implementing the functions of the above-described embodiment may also be supplied to a system or apparatus. The computer (or the CPU or MPU) of the system or apparatus may also read out and execute the program codes stored in the storage medium. In this case, the program codes read out from the storage medium implement the functions of the above-described embodiment. The storage medium which stores the program codes constitutes the present invention. The functions of the above-described embodiment are implemented when the computer executes the readout program codes. Also, an OS (Operating System) or the like running on the computer can perform part or all of actual processing on the basis of the instructions of the program codes, thereby implementing the functions of the above-described embodiment.

Further, the program codes read out from the storage medium may also be written in the memory of a function expansion card inserted into the computer or the memory of a function expansion unit connected to the computer. In this case, the CPU of the function expansion card or function expansion unit can perform part or all of actual processing on the basis of the instructions of the program codes, thereby implementing the functions of the above-described embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-320069, filed Dec. 11, 2007, which is hereby incorporated by reference herein in its entirety.

What is claimed is:

1. A print control apparatus for generating document data that has a print setting including items, the print control apparatus comprising:
    a specifying unit configured to specify at least one item among the items included in the print setting of the document data, wherein the at least one item needs to be newly set for performing a printing in a print apparatus;
    a storage unit configured to store a setting file that includes a print setting and item information, wherein the item information indicates at least one item;
    a search unit configured to search said storage unit for the setting file corresponding to the print setting of the document data in accordance with an instruction to print the document data; and
    a generation unit configured to, in a case where said search unit finds the setting file in the storage unit, set the print setting included in the found setting file as a print setting of the document data and generate print data to be output to the print apparatus, and in a case where said search unit does not find the setting file from the storage unit, accept input of a print setting of the document data and generate print data using the accepted input print setting,
    wherein the search unit searches for the setting file corresponding to the print setting of the document data to meet a condition in which all items indicated by the item information are included in the items of the print setting of the document data, and
    wherein in case where the search unit finds a plurality of setting files each of which includes the item information meeting the condition, the generating step sets the print setting included in the found setting file in which the item information includes a most number of items among the found plurality of setting files as the print setting of the document data.

2. A method of generating document data that has a print setting including items, the method comprising:
    a specifying step of specifying at least one item among the items included in the print setting of the document data, wherein the at least one item needs to be newly set for performing a printing in a print apparatus;

a storage step of storing in a storage unit a setting file that includes a print setting and item information, wherein the item formation indicates at least one item;

a search step of searching the storage unit for the setting file corresponding to the print setting of the document data in accordance with an instruction to print the document data; and a generation step of, in a case where the search step finds the setting file stored in the storage unit, set the print setting included in the found setting file as a print setting of the document data and generating print data to be output to the print apparatus, and in a case where the search step does not find the setting file from the storage unit, accepting input of a print setting of the document data and generating print data using the accepted input print setting, wherein the search step searches for the setting file corresponding to the print setting of the document data to meet a condition in which all items indicated by the item information are included in the items of the print setting of the document data, and wherein in a case where the search step finds a plurality of setting files each of which includes the item information meeting the condition, the generating step sets the print setting included in the found setting file in which the item information includes a most number of items among the found plurality of setting files as the print setting of the document data.

3. A non-transitory computer-readable medium storing a print control program executable by a computer to generate document data that has a print setting including items, the program causing the computer to:

specify at least one item among the items included in the print setting of the document data, wherein the at least one item needs to be newly set for performing a printing in a print apparatus;

store in a storage unit a setting file that includes a print setting and item information, wherein the item information indicates at least one item;

search the storage unit for the setting file corresponding the print setting of the document data in accordance with an instruction to print the document data; and in a case where the search finds the setting file stored in the storage unit, set the print setting included in the found setting file as a print setting of the document data and generate print data to be output to the print apparatus, and in a case where the search does not find the setting file from the storage unit, accept input of a print setting of the document data and generate print data using the accepted input print setting, wherein the search searches for the setting file corresponding to the print setting of the document data to meet a condition in which all items indicated by the item information are included in the items of the print setting of the document data, and wherein in a case where the search finds a plurality of setting files each of which includes the item information meeting the condition, the print setting included in the found setting file in which the item information includes a most number of items among the found plurality of setting files is set as the print setting of the document data.

* * * * *